(12) United States Patent
Siegel

(10) Patent No.: US 8,021,159 B1
(45) Date of Patent: Sep. 20, 2011

(54) STRING MATH MANIPULATIVE SYSTEM AND METHOD

(75) Inventor: Leslie Siegel, Wellington, FL (US)

(73) Assignee: String Math, LLC., Wellington, FL (US)

( * ) Notice: Subject to any disclaimer, the term of this patent is extended or adjusted under 35 U.S.C. 154(b) by 152 days.

(21) Appl. No.: 12/406,605

(22) Filed: Mar. 18, 2009

Related U.S. Application Data

(60) Provisional application No. 61/037,583, filed on Mar. 18, 2008.

(51) Int. Cl.
  *G09B 19/02* (2006.01)
(52) U.S. Cl. .......................................................... 434/203
(58) Field of Classification Search .................. 434/188, 434/191, 200, 203, 204, 205, 207, 209; D19/62, D19/64
See application file for complete search history.

(56) References Cited

U.S. PATENT DOCUMENTS

| | | | |
|---|---|---|---|
| 1,244,000 A * | 10/1917 | Soltoft | 434/205 |
| 3,758,962 A * | 9/1973 | Bagdasar | 434/205 |
| 3,811,205 A * | 5/1974 | Pitzler | 434/203 |
| 4,034,486 A | 7/1977 | Mills | |
| 4,210,093 A * | 7/1980 | Baker | 116/222 |
| 4,993,952 A | 2/1991 | Yeh | |
| 5,066,234 A * | 11/1991 | LeDesma | 434/205 |
| 5,137,452 A | 8/1992 | Pollock | |
| 5,167,505 A * | 12/1992 | Walsh | 434/205 |
| 5,205,747 A | 4/1993 | Tan | |
| 5,395,245 A * | 3/1995 | Heinz | 434/204 |
| D373,144 S * | 8/1996 | Hansen | D19/62 |
| 6,375,468 B1 | 4/2002 | Sundararajan | |
| 7,014,468 B1* | 3/2006 | Thorpe | 434/188 |
| 7,077,655 B2 | 7/2006 | Watanabe | |
| 7,153,138 B2 * | 12/2006 | Charles | 434/127 |
| D587,756 S * | 3/2009 | Rule | D19/62 |

* cited by examiner

*Primary Examiner* — Kurt Fernstrom
(74) *Attorney, Agent, or Firm* — Gold & Rizvi, P.A.; H. John Rizvi; Glenn E. Gold

(57) ABSTRACT

A string math manipulative system and method is provided including series of a particular number of holed objects threaded on strings. The holed objects comprise one or more variations in color and/or shape and/or material, with the variations configured to represent math facts. For example, to illustrate the number family summing to 5, three strings would be included in the set; one string having all holed objects of a first variation representing 5+0=5 or 0+5=5, one string having one holed object of the first variation and four holed objects of a second variation representing 4+1=5 or 1+4=5, and one string having two holed objects of the first variation and three holed objects of the second variation representing 4+1=5 or 1+4=5.

23 Claims, 20 Drawing Sheets

| 1×1 | 7×1 | 1 |
| 2×1 | 8×1 | |
| 3×1 | 9×1 | |
| 4×1 | 10×1 | |
| 5×1 | 11×1 | |
| 6×1 | 12×1 | |

| 1×5 | 7×5 | 5 |
| 2×5 | 8×5 | |
| 3×5 | 9×5 | |
| 4×5 | 10×5 | |
| 5×5 | 11×5 | |
| 6×5 | 12×5 | |

| 1×9 | 7×9 | 9 |
| 2×9 | 8×9 | |
| 3×9 | 9×9 | |
| 4×9 | 10×0 | |
| 5×9 | 11×9 | |
| 6×9 | 12×9 | |

| 1×2 | 7×2 | 2 |
| 2×2 | 8×2 | |
| 3×2 | 9×2 | |
| 4×2 | 10×2 | |
| 5×2 | 11×2 | |
| 6×2 | 12×2 | |

| 1×6 | 7×6 | 6 |
| 2×6 | 8×6 | |
| 3×6 | 9×6 | |
| 4×6 | 10×6 | |
| 5×6 | 11×7 | |
| 6×6 | 12×7 | |

| 1×10 | 7×10 | 10 |
| 2×10 | 8×10 | |
| 3×10 | 9×10 | |
| 4×10 | 10×10 | |
| 5×10 | 11×10 | |
| 6×10 | 12×10 | |

| 1×3 | 7×3 | 3 |
| 2×3 | 8×3 | |
| 3×3 | 9×3 | |
| 4×3 | 10×3 | |
| 5×3 | 11×3 | |
| 6×3 | 12×3 | |

| 1×7 | 7×7 | 7 |
| 2×7 | 8×7 | |
| 3×7 | 9×7 | |
| 4×7 | 10×7 | |
| 5×7 | 11×7 | |
| 6×7 | 12×7 | |

| 1×11 | 7×11 | 11 |
| 2×11 | 8×11 | |
| 3×11 | 9×11 | |
| 4×11 | 10×11 | |
| 5×11 | 11×11 | |
| 6×11 | 12×11 | |

| 1×4 | 7×4 | 4 |
| 2×4 | 8×4 | |
| 3×4 | 9×4 | |
| 4×4 | 10×4 | |
| 5×4 | 11×4 | |
| 6×4 | 12×4 | |

| 1×8 | 7×8 | 8 |
| 2×8 | 8×8 | |
| 3×8 | 9×8 | |
| 4×8 | 10×8 | |
| 5×8 | 11×8 | |
| 6×8 | 12×8 | |

| 1×12 | 7×12 | 12 |
| 2×12 | 8×12 | |
| 3×12 | 9×12 | |
| 4×12 | 10×12 | |
| 5×12 | 11×12 | |
| 6×12 | 12×12 | |

| 1 ÷ 1 1 | 5 ÷ 1 5<br>5 ÷ 2<br>5 ÷ 3<br>5 ÷ 4<br>5 ÷ 5 | 9 ÷ 1  9 ÷ 7 9<br>9 ÷ 2  9 ÷ 8<br>9 ÷ 3  9 ÷ 9<br>9 ÷ 4<br>9 ÷ 5<br>9 ÷ 6 |
| --- | --- | --- |
| 2 ÷ 1 2<br>2 ÷ 2 | 6 ÷ 1 6<br>6 ÷ 2<br>6 ÷ 3<br>6 ÷ 4<br>6 ÷ 5<br>6 ÷ 6 | 10 ÷ 1  10 ÷ 7 10<br>10 ÷ 2  10 ÷ 8<br>10 ÷ 3  10 ÷ 9<br>10 ÷ 4  10 ÷ 10<br>10 ÷ 5<br>10 ÷ 6 |
| 3 ÷ 1 3<br>3 ÷ 2<br>3 ÷ 3 | 7 ÷ 1  7 ÷ 7 7<br>7 ÷ 2<br>7 ÷ 3<br>7 ÷ 4<br>7 ÷ 5<br>7 ÷ 6 | 11 ÷ 1  11 ÷ 7 11<br>11 ÷ 2  11 ÷ 8<br>11 ÷ 3  11 ÷ 9<br>11 ÷ 4  11 ÷ 10<br>11 ÷ 5  11 ÷ 11<br>11 ÷ 6 |
| 4 ÷ 1 4<br>4 ÷ 2<br>4 ÷ 3<br>4 ÷ 4 | 8 ÷ 1  8 ÷ 7 8<br>8 ÷ 2  8 ÷ 8<br>8 ÷ 3<br>8 ÷ 4<br>8 ÷ 5<br>8 ÷ 6 | 12 ÷ 1  12 ÷ 7 12<br>12 ÷ 2  12 ÷ 8<br>12 ÷ 3  12 ÷ 9<br>12 ÷ 4  12 ÷ 10<br>12 ÷ 5  12 ÷ 11<br>12 ÷ 6  12 ÷ 12 |

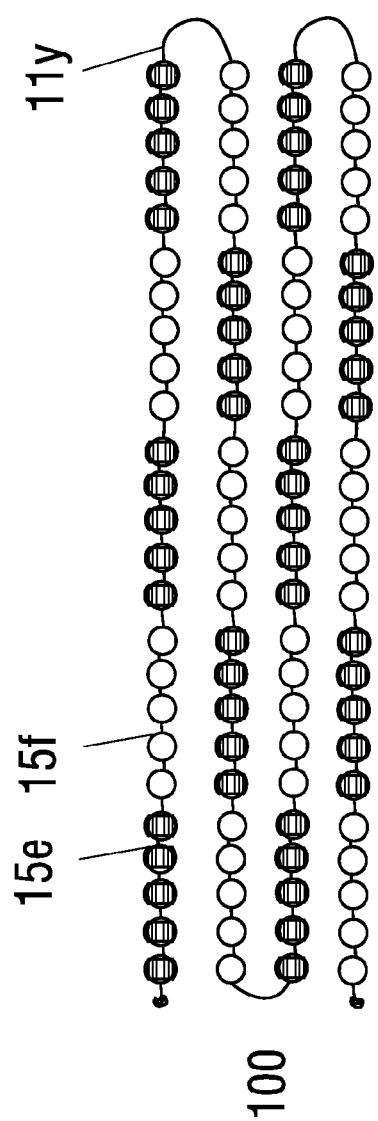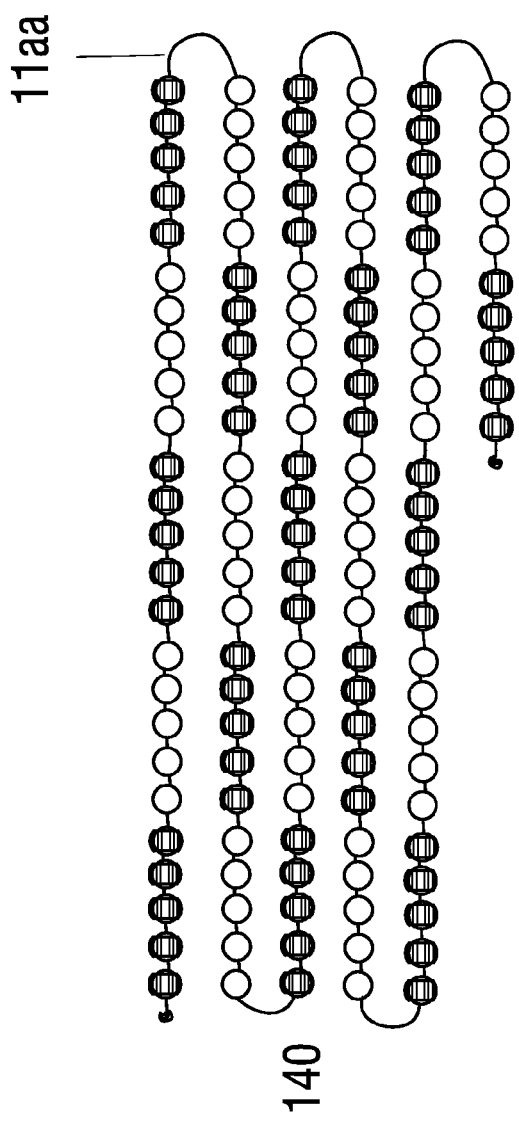
FIG. 14

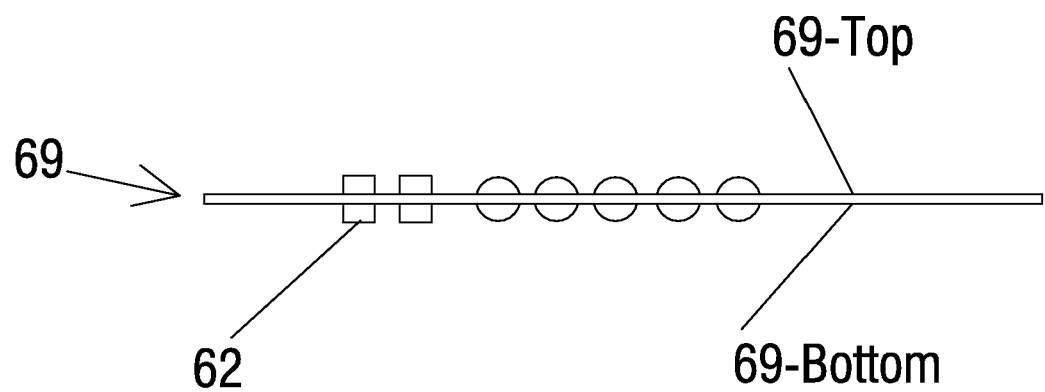

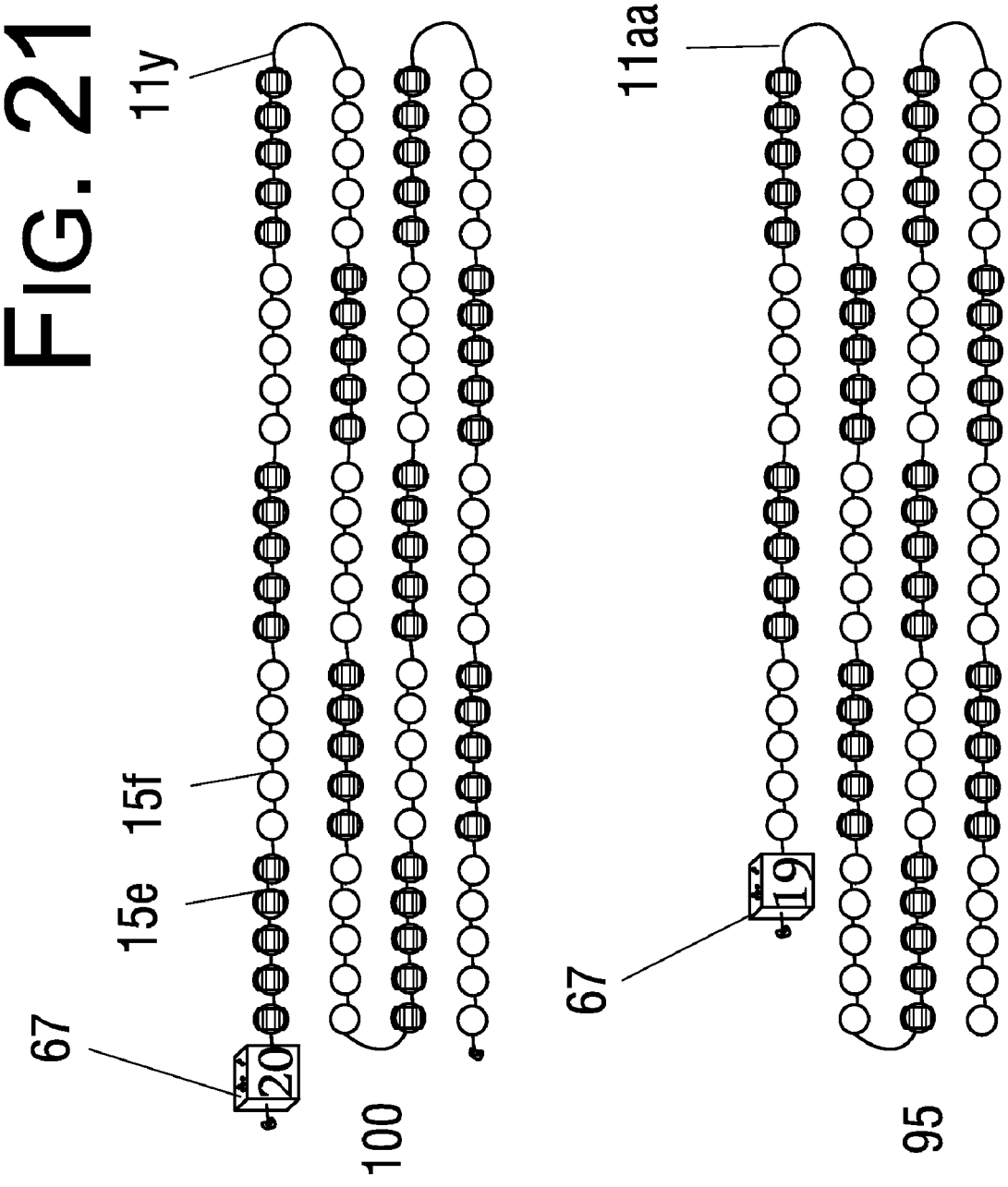

STRING MATH MANIPULATIVE SYSTEM AND METHOD

CROSS-REFERENCE TO RELATED APPLICATION

This application claims the benefit of U.S. Provisional Patent Application Ser. No. 61/037,583, filed on Mar. 18, 2008, which is incorporated herein in its entirety.

BACKGROUND OF THE INVENTION

1. Field of the Invention

The present invention relates generally to a mathematics teaching system and method, and more particularly, but not by way of limitation, to a math teaching method and manipulative that allows a student to more easily learn math facts and concepts and that comprises series of particular numbers of holed objects held on strings and configured to demonstrate math facts.

2. Description of the Prior Art

The accomplishment of successfully learning basic addition, subtraction, multiplication, and division math facts—having a quick recall and a good understanding of the concepts behind the facts—provides a strong mathematical foundation. This allows the student to approach increasingly complicated math problems with more confidence and to solve them with more ease. Conversely, failure to learn the basic math facts hampers learning and retards progression in math. Yet many elementary students (and even older students) struggle to achieve this accomplishment. It is well recognized among educational professionals, administrators, and school districts that having a quick recall and a good conceptual understanding of math facts is imperative. However, teaching these basic math facts continues to consume a large amount of teaching and re-teaching time and continues to cause stress and anxiety among the students who are endeavoring to learn.

To assist in the teaching of basic math facts, many types of rote memory systems, flash cards, number lines, hundred number charts, drills or other seatwork pages, and physical objects (math manipulatives) are available. It is well known by those skilled in the art that learning is promoted by beginning at a concrete level, such as with manipulatives, and then progressing to an abstract level, such as using numerals on paper to represent the concrete objects. Still many mathematics learning programs introduce concrete objects only very briefly, if at all, before moving to abstract work pages, thus the students may never gain a conceptual understanding. The present invention addresses this problem by providing sufficient concrete practice using physical objects to facilitate conceptual understanding.

Conventionally available math manipulatives include cubes, rods, tiles, or other individual, non-connected counting objects, which must be clicked together or pushed together as students answer written addition, subtraction, multiplication, and/or division problems. To use, the students have to initially count out the number of objects needed, but being inconsistent in counting, may not even be able to start with the right number of objects. Therefore, the process is time consuming, the actual lesson is delayed, and the learning is not focused. The student's visual memory is of objects in disarray on the desk, instead of an organized, systematic array of math facts, as provided in the current invention.

Other conventional manipulatives include an abacus or other similar manipulative, such as beads on a vertical rod, that are connected to some degree or in some manner. Both individual, non-connected counting objects and connected counting objects do provide a concrete example of number facts, but both lack a specific visual, organizational method to learn the very large number of basic math facts. For example, with addition, commonly a student might first be taught to add 0 to all the numbers from 1 to 12, then to add 1 to all the numbers from 1 to 12, then to add 2 to all the numbers from 1 to 12, then 3, etc.—resulting in over 144 separate addition facts to be drilled and learned. While this method can teach all the basic addition facts, mastery is achieved slowly, conceptual understanding may be weak, teaching time is high, and students often feel the number of math facts to be learned is infinite and nebulous, as no organizational relationship of numbers between the number facts and number families is perceivable to the student. The present invention addresses this problem by providing an organizational system and method that furnishes a beads-on-string-type structure to allow the student to systematically learn sets of specific facts. This method of use of the provided beads-on-string-type structure reduces the total number of individual facts to be learned by utilizing the commutative property of addition ($a+b=b+a$) and commutative property of multiplication ($a \times b = b \times a$), assists the student in recognizing the relationship between the addition/subtraction fact families (for example, $3+4=7$, $4+3=7$, $7-4=3$, $7-3=4$), assists the student in recognizing the relationship between the multiplication/division fact families ($3 \times 4 = 12$, $4 \times = 12$, $12/3=4$, $12/4=3$), aids the student in understanding that multiplication can be represented by repeated addition ($2+2+2=6$, $3 \times 2 = 6$), and promotes confidence as the student realizes that the number of math facts to be learned is limited and is an achievable objective.

Also, conventional methods of teaching basic math facts do not provide a concrete understanding of the commutative law of addition ($a+b=b+a$), which is generally taught in basic algebra. Yet the present invention supports a physical basis for understanding at a young age.

Accordingly, there is an established need for a practical, easy-to-use, effective, and inexpensive string math manipulative system and method providing a pre-set organization based on number families that enables the student to achieve mastery more quickly and to gain a better understanding of the concepts, while advantageously reducing teaching time and student anxiety.

SUMMARY OF THE INVENTION

The present invention is directed to an effective, straightforward string math manipulative system and method that facilitates the learning of math facts by providing an organized, systematic structure and technique. The string math manipulative system and method includes sets to teach addition, subtraction, multiplication, skip counting, and division, with the sets having a particular number of holed objects in particular configurations on a particular number of strings. A series of holed objects is threaded on a string, with the strings having opposing string ends configured with retaining mechanisms to retain the holed objects. Containers are optionally, but preferably, provided to hold sub-sets that teach math facts for a particular number family.

The particular number of holed objects and the specific colors and/or the shapes and/or sizes and/or textures and/or the materials of the holed objects are varied to represent the math facts. As an example in teaching addition, to illustrate the number family summing to "5", the following three strings would be included in the sub-set of the number family of "5": one string having all holed objects of a first color (and/or first shape and/or first material) representing $5+0=5$ or $0+5=5$, one string having one holed object of the first color (and/or first shape and/or first material) and four holed objects of a second color (and/or second shape and/or second material) representing 4+1=5 or 1+4=5, and one string having two holed objects of the first color (and/or first shape and/or first material) and three holed objects of the second color (and/or second shape and/or second material) representing 2+3=5 or 3+2=5. Similar applications are made in teaching subtraction, skip counting, multiplication, and division.

An object of the present invention is to provide a string math manipulative system and method that improves conceptual understanding of math facts.

A further object of the present invention is to provide a string math manipulative system and method that improves the memorization of math facts.

An additional object of the present invention is to provide a string math manipulative system and method that provides a concrete, tactile experience with math facts.

Another object of the present invention is to provide a string math manipulative system and method that is easy to use.

A further object of the present invention is to provide a string math manipulative system and method that fosters generalization of the math concepts for addition, subtraction, multiplication, and/or division; therefore allowing the student(s) to apply the knowledge and skills learned in the context of the string math manipulative system and method of the present invention to other situations, such as, but not limited to word problems, calculators, abaci, computer math programs, real life problems, etc.

Another object of the present invention is to provide a string math manipulative system and method that provides the prerequisite understanding of, and experience with, the concepts that will enable students to apply the acquired knowledge and generalize it, moving, in at least some embodiments, from concrete objects, to semi-abstract, to abstract representations.

An additional object of the present invention is to provide a string math manipulative system and method that is relatively inexpensive.

Another object of the present invention is to provide a string math manipulative system and method that is capable of being used with a wide variety of students, such as average students, advanced students, remedial students, physically handicapped students, visually handicapped students, color blind students, and/or deaf or hearing impaired students.

A further object of the present invention is to provide a string math manipulative system and method that, in at least some embodiments, provides permanent storage of problem solutions for each fact family, as the beads are permanently fixed on strings.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIG. 6 is a top schematic view showing an multiplication set comprising 12 multiplication number family sub-sets of a first preferred embodiment of the string math manipulative system of the present invention;

FIG. 8 is a flowchart showing the method used in teaching multiplication utilizing the "3" sub-set of the multiplication number family of "3" of the multiplication set of the first preferred embodiment of the string math manipulative system of the present invention;

FIG. 9 is a top schematic view showing a division set of a first preferred embodiment of the string math manipulative system of the present invention;

FIG. 14 is a top schematic view showing a sub-set of the skip counting set of the first preferred embodiment of the string math manipulative system of the present invention, illustrating skip counting by 5's to 100 or to 140;

FIG. 20 is a side schematic view taken along line 20-20 of FIG. 19 illustrating a representational flash card of the string math manipulative system of the present invention; and FIG. 21 is a top schematic view illustrating a signal or cue bead of the string math manipulative system of the present invention.

Like reference numerals refer to like parts throughout the several views of the drawings.

DETAILED DESCRIPTION OF THE PREFERRED EMBODIMENTS

Shown throughout the figures, the present invention is directed toward a practical, easy-to-use, effective, and inexpensive string math manipulative system and method that facilitates the learning of math facts by providing a beads-on-string system to be used with the organized, systematic methods. The string math manipulative system includes an addition/subtraction set 10-A, a skip counting set 10-SC (which may also be used to teach division without remainders), a multiplication set 10-M (which may also be used to teach division without remainders), and a division with remainders set 10-D, yet any of the individual sets, or parts of the individual sets, may profitably be used. The sets comprise numerous strings 11 with a series of a particular number of holed objects 15 threaded upon the strings 11 in specific configurations. Holed objects 15 have a discriminating characteristic or variation, such as variations of colors and/or shapes and/or sizes and/or textures and/or materials. Two discriminating characteristics or variations are used within one set to represent the numerals of a math fact. One or more holed objects 15 having a first discriminating characteristic are threaded on a string 11, with most strings 11 of the set having one or more holed objects 15 with a first discriminating characteristic and one or more holed objects with a second discriminating characteristic. The holed objects 15 are threaded upon the strings 11 in specific configurations, with the particular number of, and color/shape/texture/size/material variations of, the holed objects 15 corresponding to and representing the math facts in a number family.

Also disclosed are a variety of methods of teaching using the string math manipulative system, as well as implementations of the string math manipulative system as abstract learning aids and semi-abstract learning aids and applications, with specific implementations for blind or visually handicapped learners. Other disclosed implementations of the string math manipulative system and method include applications to reduce teaching time and make learning more efficient.

Both ends of each string 11 terminate in a retaining mechanism 12 to retain the series of holed objects 15 on the string 11. The pre-set organization of the holed objects 15 on strings 11 encourages learning, eliminating the seemingly un-relatedness or separateness of math facts. The math facts do not have to be memorized in isolation. This organized method helps the student to achieve mastery more quickly and to gain a better understanding of the concepts, advantageously resulting in less teaching time and less student anxiety.

Figure 1:
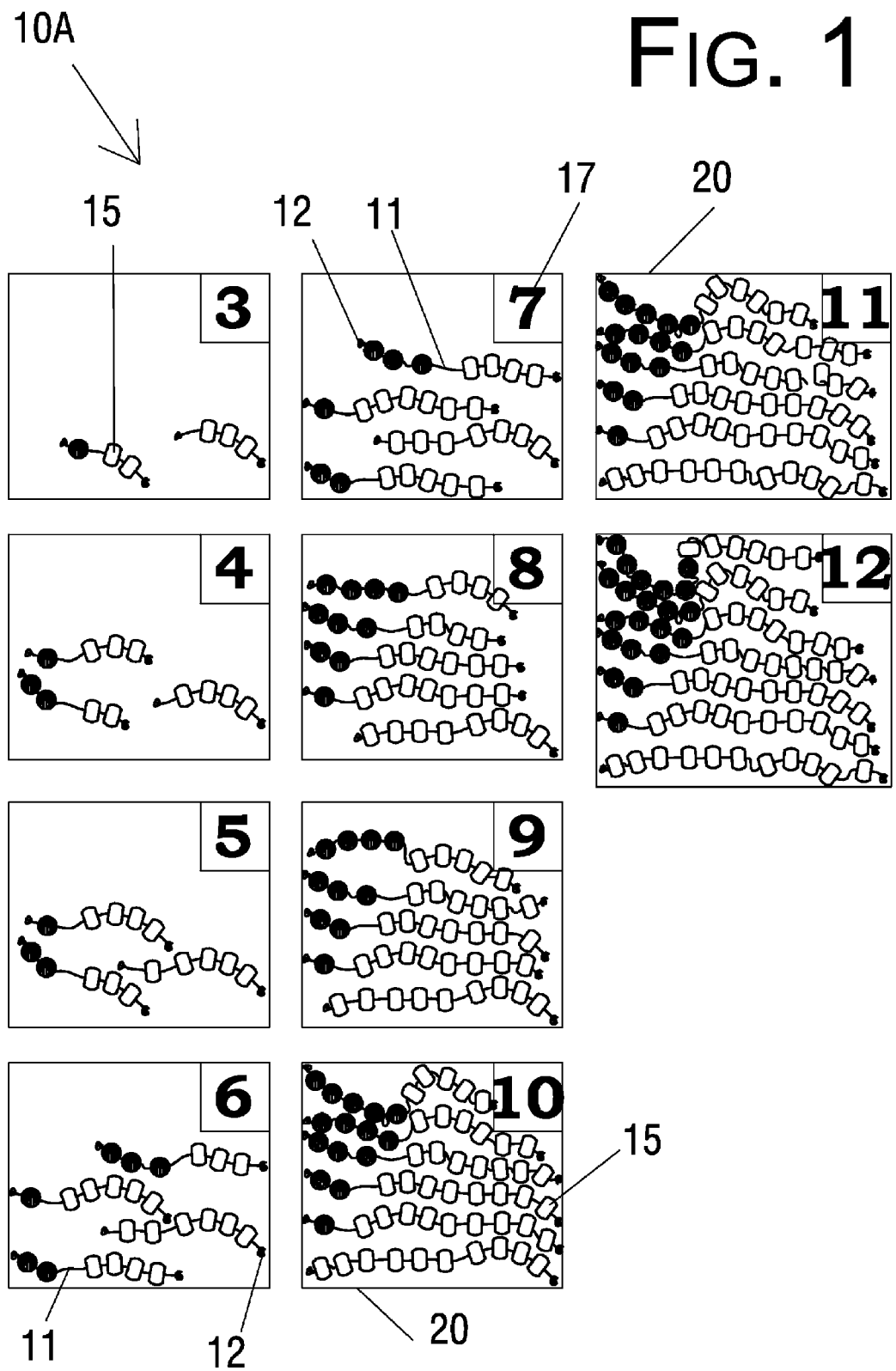
FIG. 1 is a top schematic view showing an addition/subtraction set comprising 12 number family sub-sets of a first preferred embodiment of the string math manipulative system of the present invention.

The string math manipulative system and method of the present invention can be utilized to teach numerous types of math facts, particularly addition (FIG. 1 to FIG. 3), subtraction (FIG. 1, FIG. 4, FIG. 5), multiplication (FIG. 6 to FIG. 8), division with remainders (FIG. 9 to FIG. 11), and skip counting (FIG. 12 to FIG. 15). (The multiplication manipulative sets of FIG. 6 and the skip counting sets of FIG. 12 can also be used to teach division without remainders.) The provided organized, systematic method to teach addition, subtraction, skip counting, multiplication, and/or division utilizes particular series of specific numbers of strings configured with specific configurations of holed objects. For example, to teach addition and subtraction facts the provided addition/subtraction set 10-A of the present invention is used to teach addition number families and/or fact families, while the multiplication set 10-M is used to teach multiplication, division, and/or skip counting. (For the mathematical process of addition, a number family consists of all addition fact families that have the same largest sum. Fact families are a set of facts, each of which relates the same three numbers through addition, subtraction, multiplication, or division. The following is an example of an addition/subtraction fact family: 3+4=7, 4+3=7, 7−4=3, 7−3=4. Skip counting, a basic skill presented prior to and/or in conjunction with teaching multiplication, is counting forward (or backward) by a number other than 1. For example, skip counting by 6's to 6×12 would be 6, 12, 18, 24, 30, 36, 42, 48, 54, 60, 66, 72.)

Depending on the age and ability of the student(s), the steps used in the provided organized method of teaching math facts using the string math manipulatives of the present invention may be presented in one or only a few practice sessions, but typically numerous learning sessions will be required and are preferable. Although the steps are shown sequentially, a first learning session might only progress through one or two of the first few steps, with later learning sessions incorporating more steps. Not every step is required to be performed in every learning session, or even at all. Also, before use of the string math manipulative system and method of the present invention, some pre-teaching may optionally be done, such as, for example, teaching the vocabulary, symbols, and concepts of the mathematic operations to be presented with the string math manipulative system and method of the present invention.

Holed objects 15 are provided in one or more of a variety of shapes, colors, sizes, textures, and materials, generally having a first variation and a second variation of color, shape, size, texture, and/or materials. Holed objects 15 are any physical, touchable items that are configured (or easily configurable) with a hole that is sized and configured to receive the string 11. The hole generally extends through a central area of the holed object 15. Holed objects 15 can be any of a wide variety of small items that could be held in a hand, including items that are soft or rigid, edible or non-edible. Holed objects 15 comprise any one or more of a wide variety of generally small and/or manipulatable items, such as, for example, foam beads, wooden beads, plastic beads, metal beads, magnetic beads, glow-in-the-dark beads, glass beads, foods with holes such as candies or cereals or tubular pasta, and objects in which a hole can be pierced or created with little effort, such as soft foods (for example, marshmallows or pepperoni slices) or elastic or flexible materials (for example, sponges or small erasers). Holed objects 15 may be smaller, as might be appropriate for older students, or may be larger to meet the needs of younger students or students with physical handicaps; the approximate range of size would be approximately between 8 mm and 25 mm. The choice and size of the particular holed object 15 can be based on cost, availably, durability, tactile interest, student age, student handicaps, student's interests, student hand size, student ability, visual acuity, dexterity, and the like.

The containers 20 (FIG. 1, FIG. 6) are preferably configured to be reclosable, so the contents can be easily used and easily stored for future uses, and are preferably configured to be transparent or translucent to allow for ready identification of the interior contents by the teacher and/or the student(s). Containers 20 are sized to contain the number of strings 11 and holed objects 15 required for use in the string math manipulative system. Containers 20 may be made of flexible or rigid materials, but are preferably constructed of child-safe plastics. Containers 20 may be, for example, plastic bags, boxes, or transparent hard plastic rectangular lidded containers, but are preferably clear plastic bags. The specific materials and shape of containers 20 may be dictated by considerations such as economics, processing convenience, storage efficiency, student dexterity, and safety.

Containers 20 are preferably provided with a designation 17 to permit quick identification of the particular sub-set of the addition/subtraction set 10-A or the particular sub-set of the multiplication/division set 10-M, skip counting set 10-SC, or division set 10-D to be utilized. For example, to learn the sub-set of the number family of "5", the container 20 (FIG. 1) with the designation "5 +, –" would be chosen from the addition/subtraction set 10-A. Or to learn the multiplication/division of the sub-set of the number "5", the container with the designation "5 ×, ÷" would be chose from the multiplication/division set. The container 20 labeled "5" would contain all the strings 11 of beads 15 needed to represent all the addition and subtraction number facts for 5. Optionally, the designation 17 can be imprinted in Braille to accommodate visually handicapped students. Optionally, instructions and/or bead-on-string images can be printed on a surface of one or more of the containers 20 or can be printed on paper or plastic that is enclosed in one or more of the containers 20, or can be provided separately as in a lesson book. The lesson book can be designed either for the general student population or can be adapted to meet the needs of students having a particular handicap, such as hearing impaired or visually impaired students. Optionally, designation 17 can include a printed set of the math facts included in the bag. For example, all the addition facts of the addition number family of "5" or all the multiplication facts of the "5" times table.

Strings 11 are not only sufficiently long to contain the series of holed objects 15, but also are configured with enough extra length to allow manual manipulation of holed objects 15, allowing the student to move holed objects 15 from side to side along the string 11. Strings 11 may be made of any thin, elongated material, either manmade or naturally occurring, such as string, yarn, cord, floss, wire, braided strands, leather, plastic, elastic, or thread. Strings 11 additionally can be made of edible, thin, elongated materials, such as candy laces. Strings 11 are preferably flexible, but rigid devices, such as wooden or plastic rods, are within the scope of the invention. The number of strings 11 holding holed objects 15 in each of the containers 20 will be dependent upon the mathematical operation (addition, subtraction, skip counting, multiplication, and/or division) being taught, as described in detail below.

Each opposing end of string 11 is configured with a retaining mechanism 12. Retaining mechanism 12 may be a knot integrally formed from the end of string 11, a crimp closure, a clasp, a clamp, a knob formed of plastic or other polymer, or other relatively small mass projecting a sufficient distance from the string to retain the holed objects 15. Alternatively, retaining mechanism 12 may be a combination of the above materials, such as a knot integrally formed from the end of string 11 with a coating of a plastic or other polymer to further secure the knot.

Figure 2:
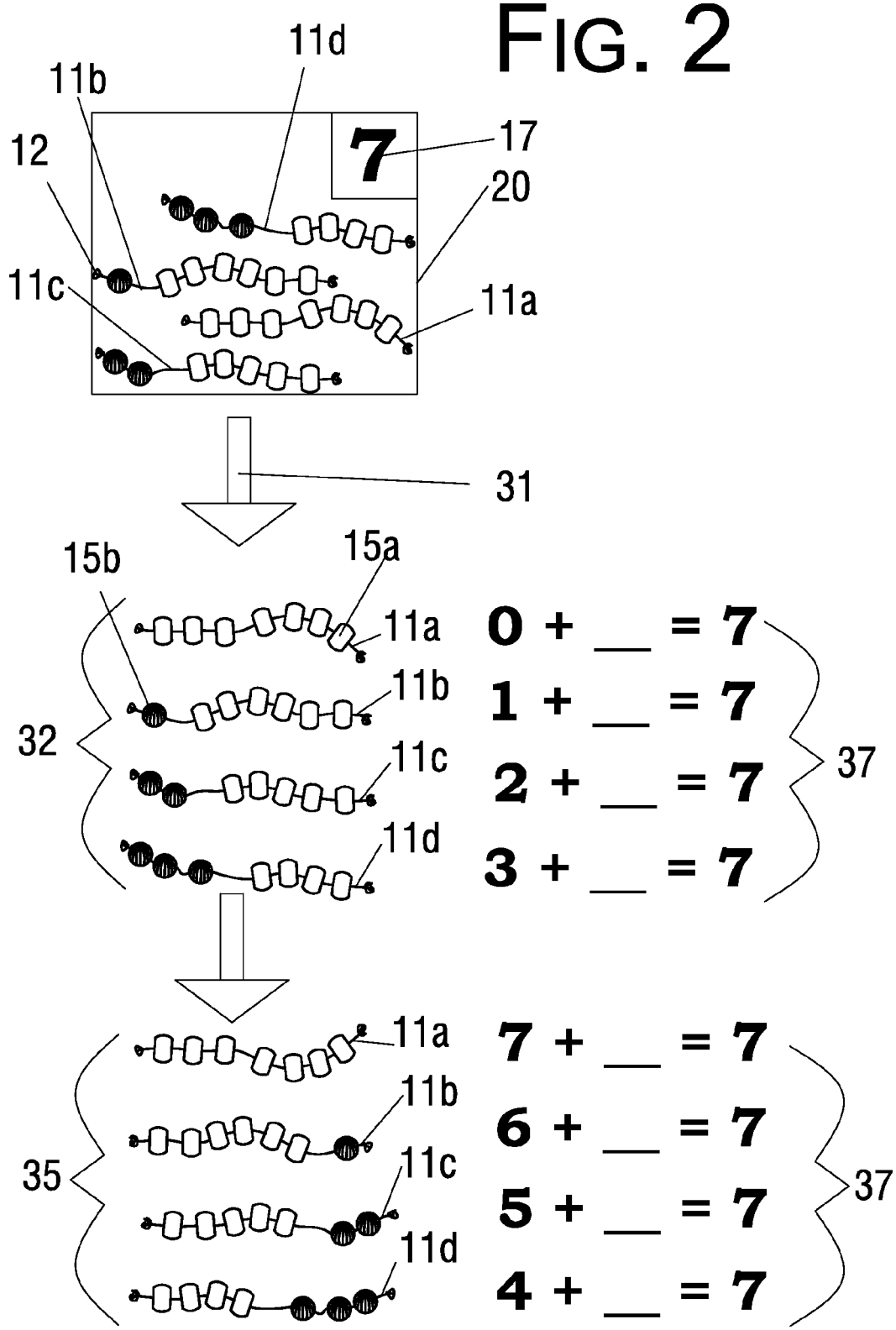
FIG. 2 is a top schematic view showing the sub-set of the number family of "7", of the first preferred embodiment of the string math manipulative system of the present invention, as utilized with the method to teach addition, with the mathematical representation of the number family of "7" sub-set.
Figure 3:
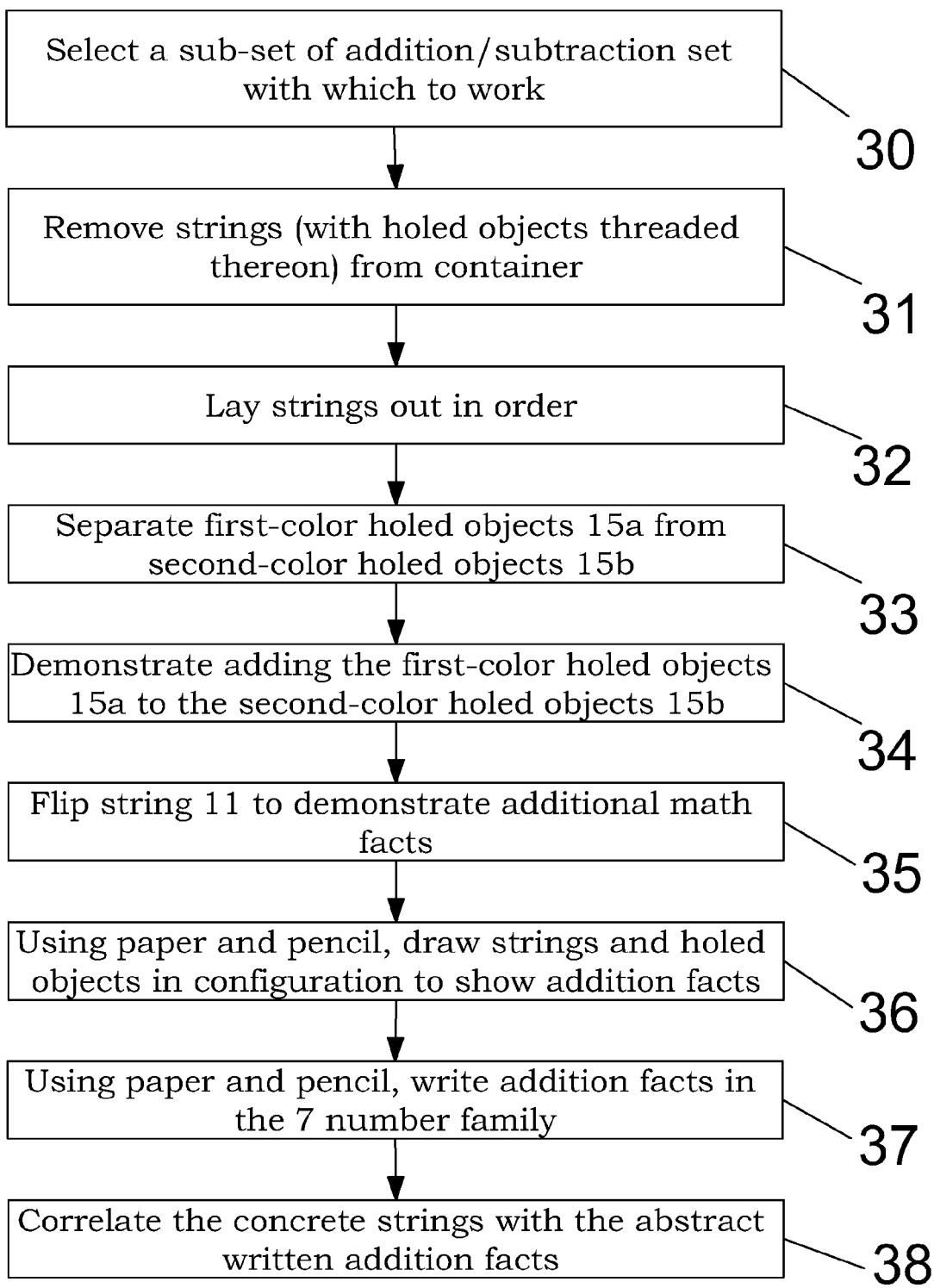
FIG. 3 is a flowchart showing the method used in teaching addition utilizing the "7" sub-set of the addition number family of "7" of the addition/subtraction set of the first preferred embodiment of the string math manipulative system of the present invention.

Referring now to the illustration of FIG. 2 and the flowchart of FIG. 3, the method used to teach addition math facts using the addition/subtraction set 10-A of the first preferred embodiment of the present invention is shown. For each sub-set (number family), a specified number of flexible strings (with threaded holed objects) will be used, with the specified number being equal to the number of unique pairs of addends that sum to the number of holed objects. For example, for the sub-set or number family of "5", three strings would be used each with five holed objects, as follows: 1. A first string for 5+0=5 or 0+5=5; 2. A second string for 4+1=5 or 1+4=5; and 3. A third string for 3+2=5 or 2+3=5.

FIG. 2 shows a single sub-set (the sub-set of the "7" number family) of the addition/subtraction set 10-A and the addition facts associated with the "7" number family sub-set, as can be used with the method illustrated in FIG. 3.

Referring now to FIG. 3, to begin the instruction for addition, the sub-set of the desired number family with which the student is to work is selected 30. For example, when the number family of "7" is chosen, the four strings are removed 31 from the container 20 that is designated "7", as illustrated in FIG. 2. Each string is threaded with seven holed objects. A first string 11a (FIG. 2) is threaded with seven holed objects of a first variation, having a first discriminating characteristic (for example, a first shape and a first color), designated 15a, representing 7+0=7 or 0+7=7. A second string 11b is threaded with seven holed objects of a second variation (a second shape and a second color), with six holed objects being of a first variation 15a and with one holed object being of a variation 15b, representing 6+1=7 or 1+6=7. A third string 11c is threaded with five holed objects of the first variation 15a and with two holed objects of the second variation 15b, representing 5+2=7 or 2+5=7. The third string 11c is threaded with four first-variation holed objects 15a and with three second-variation holed objects 15b, representing 4+3=7 or 3+4=7. Optionally, both the color and the shape of the holed objects may vary (as illustrated), the color alone may vary (illustrated in FIG. 16), or the shape, size, texture, color, and/or material may vary. Especially if this is the first introduction to the string math manipulative, the students may optionally be allowed free time to play with, and familiarize themselves with, the string math manipulative at this point, or at other points, upon the discretion of the teacher.

The strings 11a, 11b, 11c, 11d (FIG. 2) are then put 32 (FIG. 3) in order from the string having no second-variation holed objects 15b (string 11a) to the string having the most second-variation holed objects 15b (string 11d). For tactile practice in the addition facts that add up to seven, the student may separate 33 the objects between the two variations, pulling the variations to different ends of the string. The student may move holed objects 15 along string 11 to physically mirror the math operation—either with eyes open, or if, as illustrated in the first embodiment, the holed objects of the first variation are configured with a first shape and the holed objects of the second variation are configured with a second shape, even with the eyes closed. Further the student may hold the first-variation holed objects 15a in one hand and the second-variation holed objects 15b in the other hand. Also, the student may demonstrate 34 and verbalize to him or her self, or to others, the addition of the first-variation holed objects 15a to the second-variation holed objects 15b. Concrete, tactile experiences of these types with the string math manipulative help students internalize the math facts and understand the concept behind the facts, as opposed to only learning the math facts by rote memory.

To teach the remaining addition facts, the strings 11a, 11b, 11c, 11d are flipped over 35 or rotated 180 degrees; thereby, for example, string 11d, which previously represented 3+4=7, will now represent 4+3=7. This also introduces the students to the commutative property of addition. Flipping the strings allows the student to see the total number of math facts to learn is less than the number of math facts when written out on paper. Therefore memorization feels finite and more manageable to the student, who now sees the math facts for the number family as a unit.

Preferably, after the above steps have been practiced sufficiently, to help the student(s) move from the concrete steps above to the semi-abstract (pictorial) and to the abstract—while maintaining an understanding of the concepts behind the facts—the student(s) can utilize pencil and paper. The student(s) may be instructed to draw 36 the strings with the holed objects, progressing to the semi-abstract level of learning. After drawing 36 the strings or during a later learning session, the student(s) can write 37 addition facts of the "7" number family in the vertical format and/or the horizontal format. The student(s) can correlate 38 the concrete strings 11a, 11b, 11c, 11d with the abstract written addition facts.

Other addition facts for other number families would be taught in a similar manner using the appropriate sub-set of the addition/subtraction set 10-A of the present invention.

While the example of FIG. 2 illustrates the present invention using a first-variation holed object 15a having both a first color and a first shape and a second-variation holed object 15b having both a second color and a second shape, other variations of colors, shapes, sizes, textures, and materials are within the scope of the invention.

Figure 4:
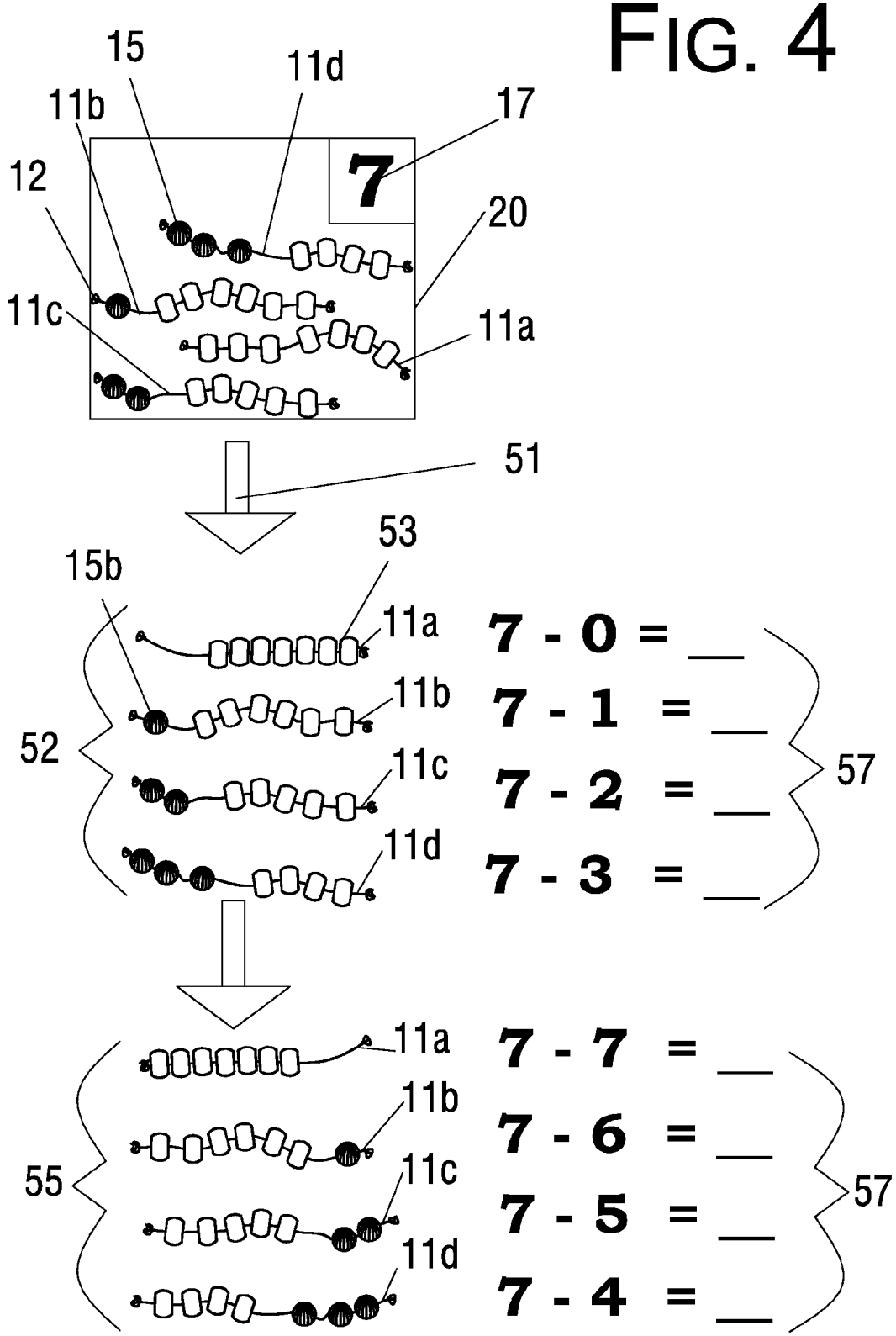
FIG. 4 is a top schematic view showing the number family of "7" sub-set of the addition/subtraction set of the first preferred embodiment of the string math manipulative system of the present invention as applied to teaching subtraction, with the mathematical representation of the number family of "7" sub-set.
Figure 5:
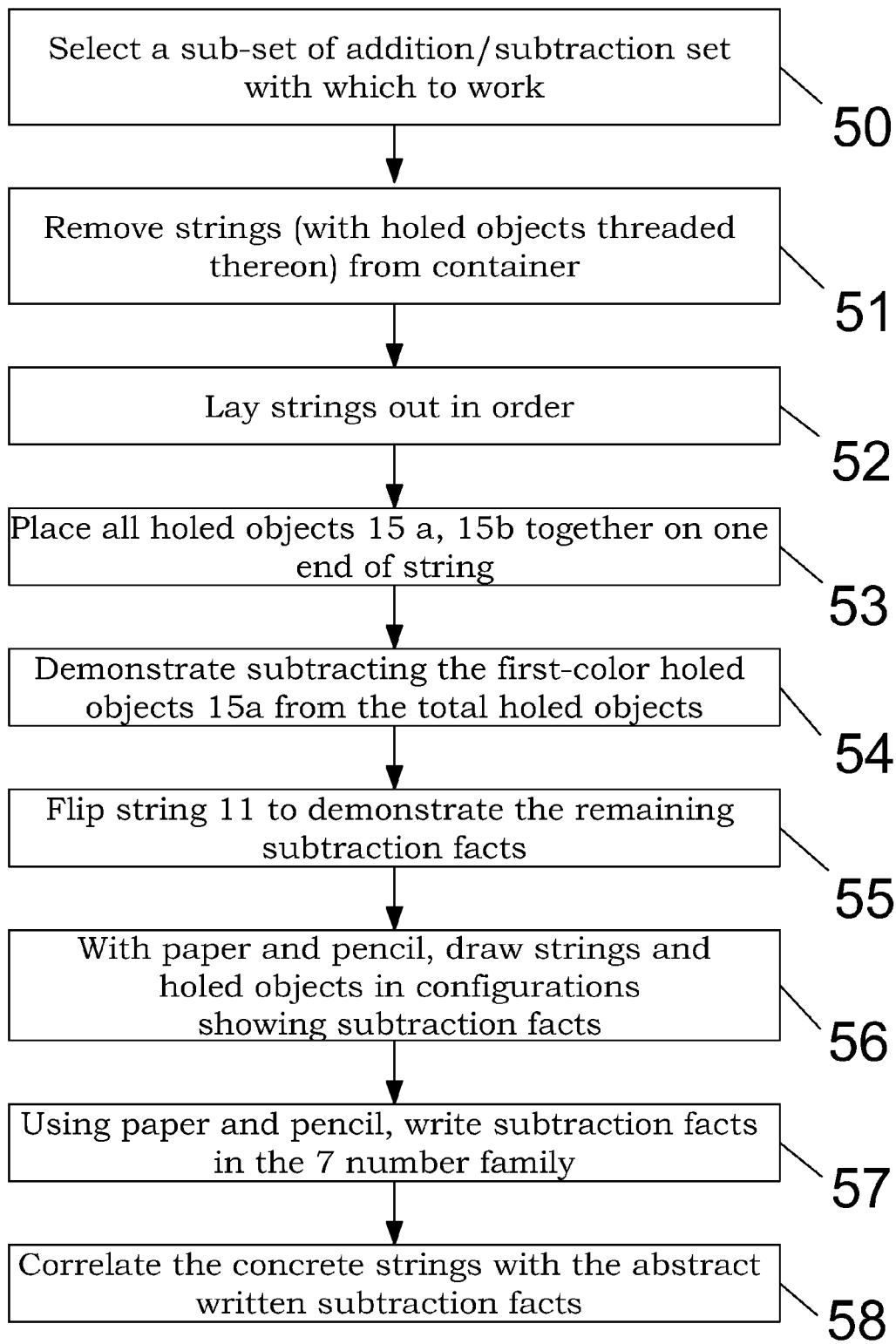
FIG. 5 is a flowchart showing the method used in teaching subtraction utilizing the "7" number family sub-set of the addition/subtraction set of the first preferred embodiment of the string math manipulative system of the present invention.

Referring now to the illustration of FIG. 4 and the flowchart of FIG. 5, the method used to teach subtraction math facts using the addition/subtraction set 10-A of the first preferred embodiment of the present invention is shown. FIG. 4 shows a single sub-set (the sub-set of the "7" number family) of the addition/subtraction set 10-A and the subtraction facts associated with the "7" number family sub-set. In teaching the subtraction facts, the total number of holed objects on the string 11 would be the minuend of the subtraction fact, with a series of a first variation of holed objects 15a being "taken away" from the minuend by sliding along the string 11. The remaining second series of the second variation of holed objects 15b would be the remainder, using the form of minuend−subtrahend=difference.

To begin the instruction for subtraction, the desired sub-set is selected 50 (FIG. 5). If the "7" number family sub-set is selected 50, the four strings are removed from the container 20 that is designated "7". Each string is provided as threaded with seven holed objects, in the configuration described above. As in using the string math manipulative to teach addition, the students may optionally be allowed free time to play with the string math manipulative at this point, or at other points, upon the discretion of the teacher.

The strings 11a, 11b, 11c, 11d (FIG. 4) are then laid out 52 in order from the string having no second-variation holed objects 15b (string 11a) to the string having the most second-variation holed objects 15b (string 11d). For tactile practice in the subtraction facts, the student pushes 53 both variations of the holed objects 15a, 15b to one end of string 11. The student then slides 54 the first-variation holed objects 15a from the second-variation holed objects 15b, demonstrating in a tactile, concrete manner, the subtraction facts.

To teach the remaining subtraction facts in the "7" number family, the strings 11a, 11b, 11c, 11d are flipped over 55 or rotated 180 degrees; thereby, for example, string 11d, which previously represented "7−3=_____", will now represent "7−4=_____".

After practicing with the concrete holed objects 15a, 15b threaded on string 11, preferably the student(s) may be instructed to draw 56 (FIG. 5) the strings with the holed objects. After drawing 56 the strings or at a separate learning session, the student(s) can write 57 subtraction facts in the "7" number family and can correlate 58 the concrete strings 11a, 11b, 11c, 11d with the abstract written subtraction facts.

The subtraction facts of other number families would be taught in a similar manner using the appropriate sub-set of the addition/subtraction set 10-A of the present invention.

Teaching math facts by this structured method with the present invention encourages repeated handling of the strings 11 of each set and sub-set. While putting the strings 11 in order and manipulating the objects 15 on the strings 11 the student begins to progress from the concrete to the abstract concept of allowing numerals to represent the concrete objects. This progress proceeds generally from holding and touching the holed objects 15 on the strings 11 to verbalizing the number family facts, to drawing, and to writing the facts, thus internalizing the math facts. Even if only the first steps are completed and no paper is used, the string math manipulative will lead to memorization of number facts.

After practicing, students become familiar with the patterns and configurations within each number family sub-set, thus this array is then consistent and predictable to the student. This reduces student frustration.

As well as teaching addition and subtraction, the string math manipulative system and method of the present invention can be used to teach skip counting, multiplication, and division.

Referring now to the illustration of FIG. 6, the multiplication set 10-M of the first preferred embodiment of the present invention is shown. Numerous containers 20 are provided, each containing a multiplication number family sub-set. While the sub-sets of multiplication number families from "1" to "12" are illustrated, a lesser number or greater number of sub-sets may be used. For example, a teacher may only wish to teach the sub-sets of multiplication number families from to "1" to "10", or, alternatively, a teacher of a particular grade may only teach the sub-sets of multiplication number families from "1" to "5" leaving the other multiplication number families for a higher grade, or, alternatively, a remedial teacher may need to only use the sub-sets of multiplication number families from "6" to "9".

Each container 20 contains a specified number of strings. The specified number of strings is equal to the number of multiplication facts the teacher wishes to teach, so may be any number of strings; however, in most instances, either ten (not illustrated) or twelve (as illustrated) strings will be included, depending on whether the teacher desires to teach the multiplication facts to ten or to twelve. Each string 11 is configured with holed objects 15 to represent the multiplication facts of each multiplication number family. For example, the multiplication number family of "5" contains 12 strings having 5, 10, 15, 20, 25, 30, 35, 40, 45, 50, 55, or 60 holed objects (of either one or two types) representing the multiplication facts of 1×5, 2×5, 3×5, 4×5, 5×5, 6×5, 7×5, 8×5, 9×5, 10×5, 11×5, and 12×5, respectively. Optionally, for a further example, if the teacher only wished to teach the multiplication number family of "5" to 5×5, only 5 strings would be included, having 5, 10, 15, 20, and 25 holed objects.

A repeating pattern is provided that represents the multiplication facts, as follows: 1. a series of first-variation holed objects 15a, with the number of first-variation holed objects 15*a* being equal to number to the multiplication number family being taught; and 2. a series of second-variation holed objects 15*b*, with the number of second-variation holed objects 15*b* being equal to number to the multiplication number family being taught. The pattern is repeated until the number of holed objects represents the multiplication fact. This repeated pattern helps the students observe repeated addition.

Standard names for the parts of a multiplication fact are multiplier (or term)×multiplicand (or term)=product. The total number of holed objects on a particular string corresponds to the product of the multiplication fact. The number of holed objects in each series of first-variation-type holed objects plus in each series of second-variation-type holed objects corresponds to the multiplicand. The number of series corresponds to the multiplier. The first and second terms (multiplier and multiplicand) can, of course, be inverted to still obtain the product.

Figure 7:
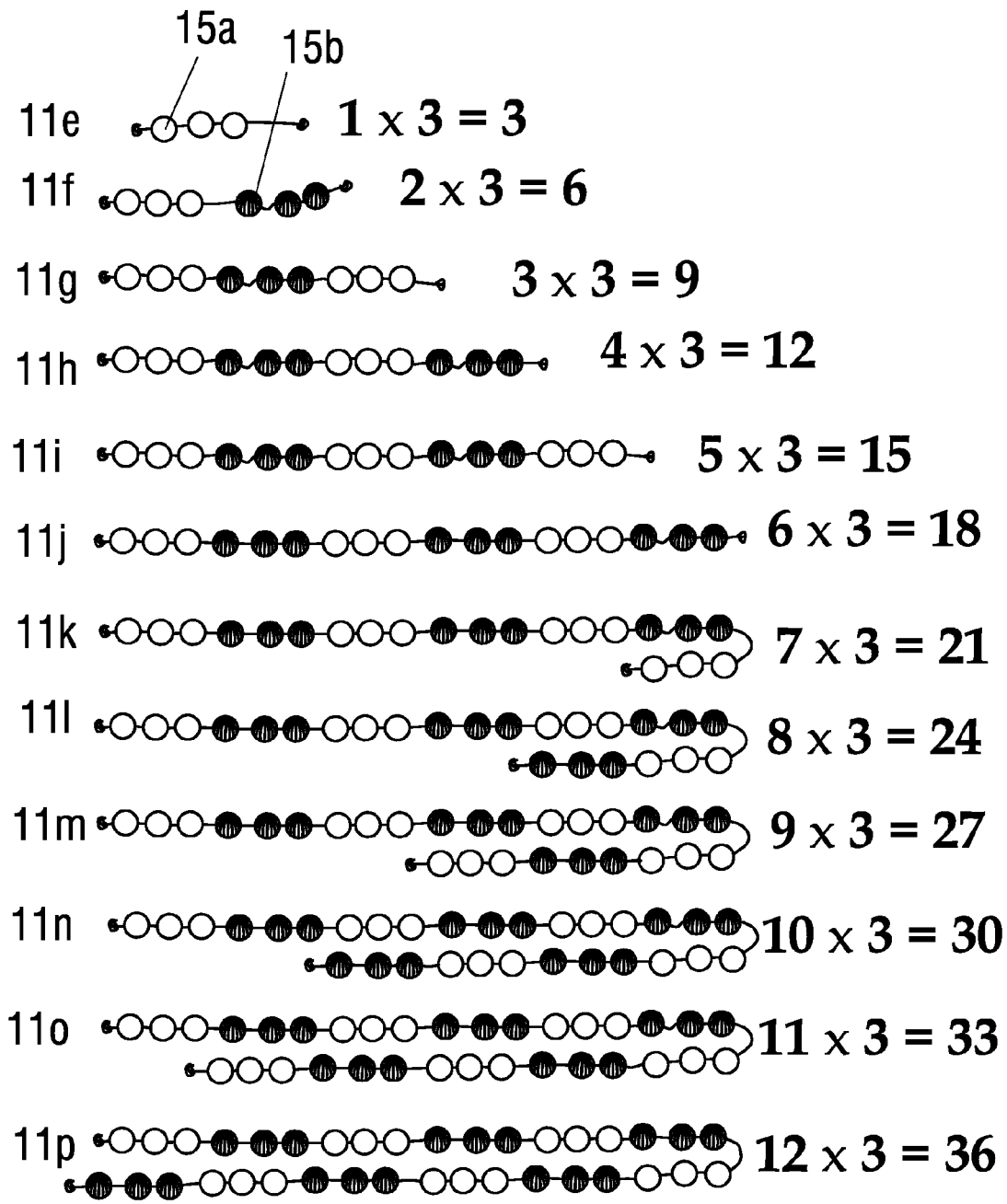
FIG. 7 is a top schematic view showing the sub-set of the multiplication number family of "3", of the multiplication set of the first preferred embodiment of the string math manipulative system of the present invention, as utilized with the method to teach multiplication and the method to teach division.

FIG. 7 shows the strings preferably included in the sub-set of the "3" multiplication number family representing the multiplication fact of 1×3=3 (string 11*e*) to the multiplication fact of 12×3=36 (string 11*p*). For example, string 11*n* is threaded with thirty holed objects of two colors. The repeating pattern that represents 10×3=30 is the following: 1. a series of three first-variation holed objects 15*a*; and 2. a series of three second-variation holed objects 15*b*. The pattern is repeated until the number of holed objects reaches thirty. The total number of objects on the string, 30, corresponds to the product, while the number in each series, 3, corresponds to the multiplicand, and the number of series, 10, corresponds to the multiplier.

The other strings of sub-set of the "3" multiplication number family and the other strings of sub-sets of other multiplication number families follow a similar pattern with two variations, except for the strings for any number multiplied by one, which will only have the first-variation holed objects 15*a*. For example, the multiplication fact of 1×3=3, has only the first series of three first-variation holed objects 15*a*.

Figure 8:
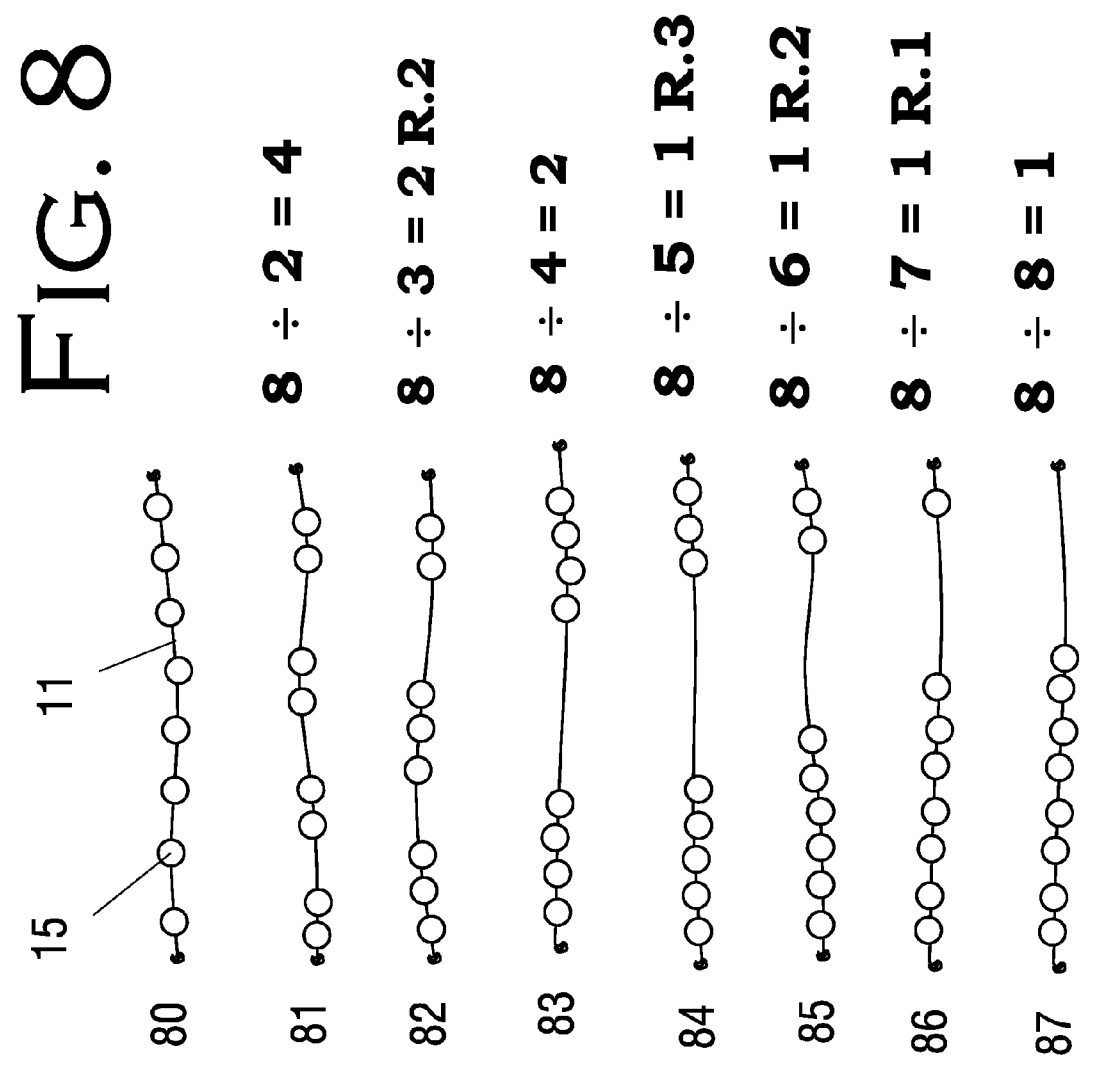

Referring now to FIG. 8, the method of teaching multiplication facts using the string math manipulative of the present invention is presented.

To begin the instruction for multiplication, the sub-set of the desired multiplication number family with which the student is to work is selected 70 (FIG. 8). For example, when the multiplication number family of "3" is chosen, the twelve strings are removed 71 from the container 20 that is designated "3", as is illustrated in FIG. 7. The students may optionally be allowed free time to play with the string math manipulative at this point, or at other points, upon the discretion of the teacher.

The number of sets of first-variation holed objects 15*a* and sets of second-variation holed objects 15*b* are counted 72, in order to lay 73 the strings out in order from least sets to most sets. For tactile practice, the student may separate 74 the objects between the first and second variations, assisting the student in understanding that multiplication is repeated addition. The student may touch and move holed objects 15 along string 11, physically mirroring the math operation. This may be done either with eyes open, or if the holed objects are configured with two shapes, even with the eyes closed. The student may demonstrate and verbalize 75 to him or her self, or to others, the multiplication fact. Also, the student can draw 76 the holed objects on the string, configured to represent the multiplication fact. These concrete, tactile experiences help students understand the concept behind the facts and internalize the multiplication facts.

The students can optionally work on one isolated fact by taking only that string out of the container 20.

The students can also study and understand 77 the commutative property of multiplication (a×b=b×a). Strings from different multiplication families (in different containers) representing the commutative property of multiplication can be compared. For example, the multiplication fact of 10×3=30 (from the container designated "3") can be compared to the multiplication fact of 3×10=30 (from the container designated "10").

After sufficient practice, the student(s) move from the concrete steps to the semi-abstract (pictorial) and to the abstract, using numerals to represent the physical objects by writing 78 the multiplication fact in the vertical format and/or the horizontal format. Drawn figures can be correlated 79 with skip counting. Also, the student(s) can correlate 80 any or all of the physical strings 11*e* to 11*p* with abstract written multiplication facts.

Other multiplication facts for other number families would be taught in a similar manner using the appropriate sub-set of the multiplication set 10-M of the present invention.

Referring now to the illustration of FIG. 9, the division set 10-D of the first preferred embodiment of the present invention is shown. Numerous containers 20 are provided, each containing a division number family sub-set. While the sub-sets of division number families from "1" to "12" are illustrated, a lesser or greater number of sub-sets may be used. For example, sub-sets to only "10" could be provided, or sub-sets of only troublesome division families could be used, such as specific facts or sub-sets which are difficult for an individual student to memorize.

Figure 10:
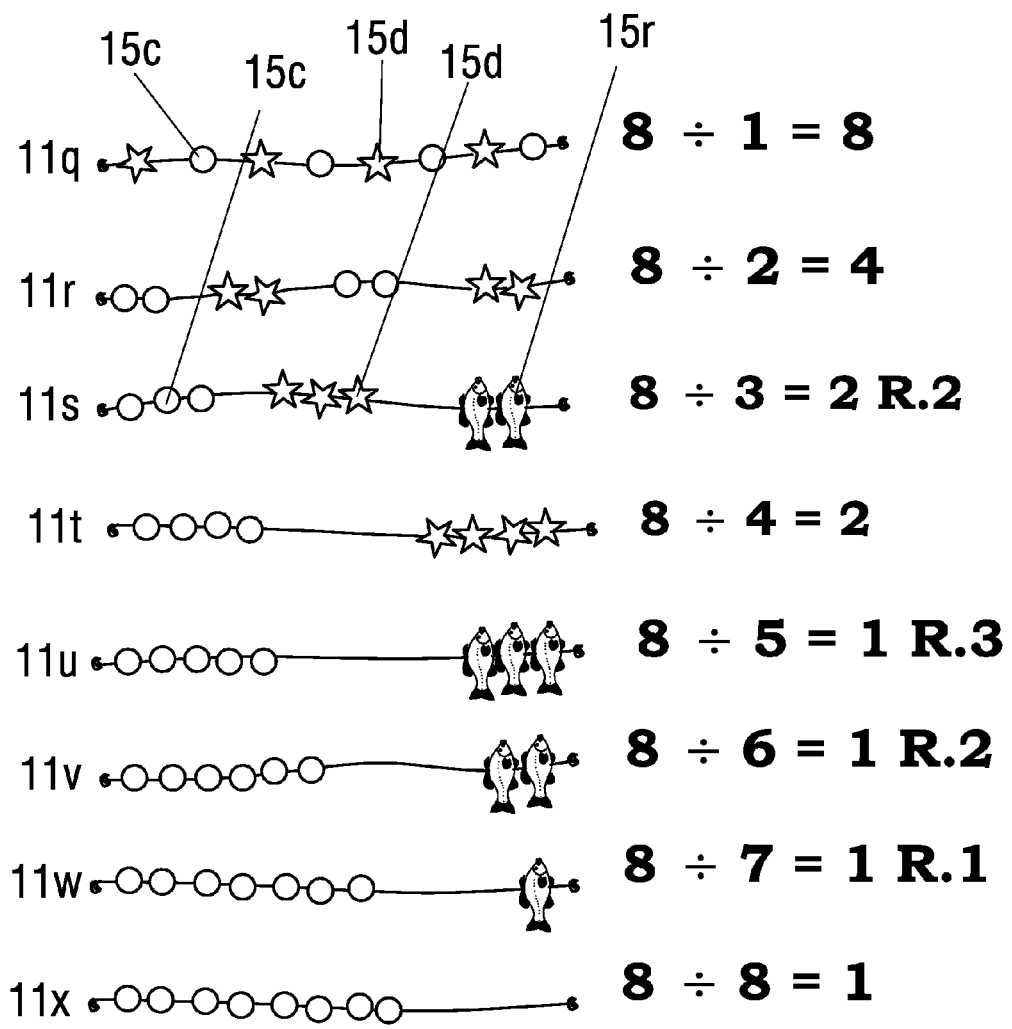
FIG. 10 is a top schematic view showing the sub-set of the division number family of "8", of the division set of the first preferred embodiment of the string math manipulative system of the present invention, as utilized with the method to teach division.

Each container 20 contains a specified number of strings, with the number of strings 11 equal to the number of the division number family. Each string 11 is configured with holed objects 15 with variations in shape, color, and/or material to represent division of the number. For example, as illustrated in FIG. 10, the division number family of "8" contains eight strings, all having eight holed objects 15, but with different variations to represent the division facts of 8/1=8, 8/2=4, 8/3=2 remainder 2, 8/4=2, 8/5=1 remainder 3, 8/6=remainder 2, 8/7=1 remainder 1, 8/8=1. (A remainder is the number that is left over when there is less than the number of objects needed to make another group.)

A repeating pattern is provided that represents the division facts, as follows: 1. a series of first-variation holed objects 15*c*, with the number of first-variation holed objects 15*c* being equal to the number being divided into the number of the number family being taught; and 2. a series of second-variation holed objects 15*d* being equal in number to the number of the first-variation holed objects 15*c*. The pattern is repeated until the number of the remaining holed objects is too small to allow a full series of either first-variation holed objects 15*c* or second-variation holed objects 15*d*. Then a third variation holed object 15*r* (FIG. 10) having a separate particular shape and/or color and/or material is used to designate a "remainder". Preferably this same third variation holed object 15*r* having the particular shape and/or color and/or material is used throughout the containers of the division set 10-D, to aid the student(s) in immediately recognizing the particular third variation holed object 15*r* as a "remainder" by its constant shape, color, and feel—with eyes open or closed.

FIG. 10 illustrates the strings 11*q* to 11*x* preferably included in the sub-set of the "8" division number family configured to represent the division of the number "8" by the numbers "1", "2", "3", "4", "5", "6", "7", and "8", respectively. For example, string 11*s* is threaded with eight holed objects of three shapes. The pattern that represents "8/3=2 remainder 2" is the following: 1. a series of three first-variation holed objects 15c; 2. a series of three second-variation holed objects 15d; and 3. a series of two third variation holed objects 15r designating the "remainder". The other sub-sets of the division set 10-D are similarly configured.

Considering string 11r and using the format of a/b=c, where a is the dividend, b the divisor, and c the quotient, the total number of objects on the string (8) corresponds to the dividend. The number (2) of first-variation holed objects 15c in the first series equals the number (2) of second-variation holed objects 15d in the second series, both being equal to 2 and corresponding with the divisor. The number of series (4) corresponds to the quotient.

Optionally, the sub-sets to teach division with the string math manipulative system of the present invention can be divided in other ways. For example, strings with holed objects representing the division facts of 2/2, 3/2, 4/2, 5/2, 6/2, 7/2, 8/2, 9/2, 10/2, 11/2, and 12/2 can be form a sub-set.

Figure 11:
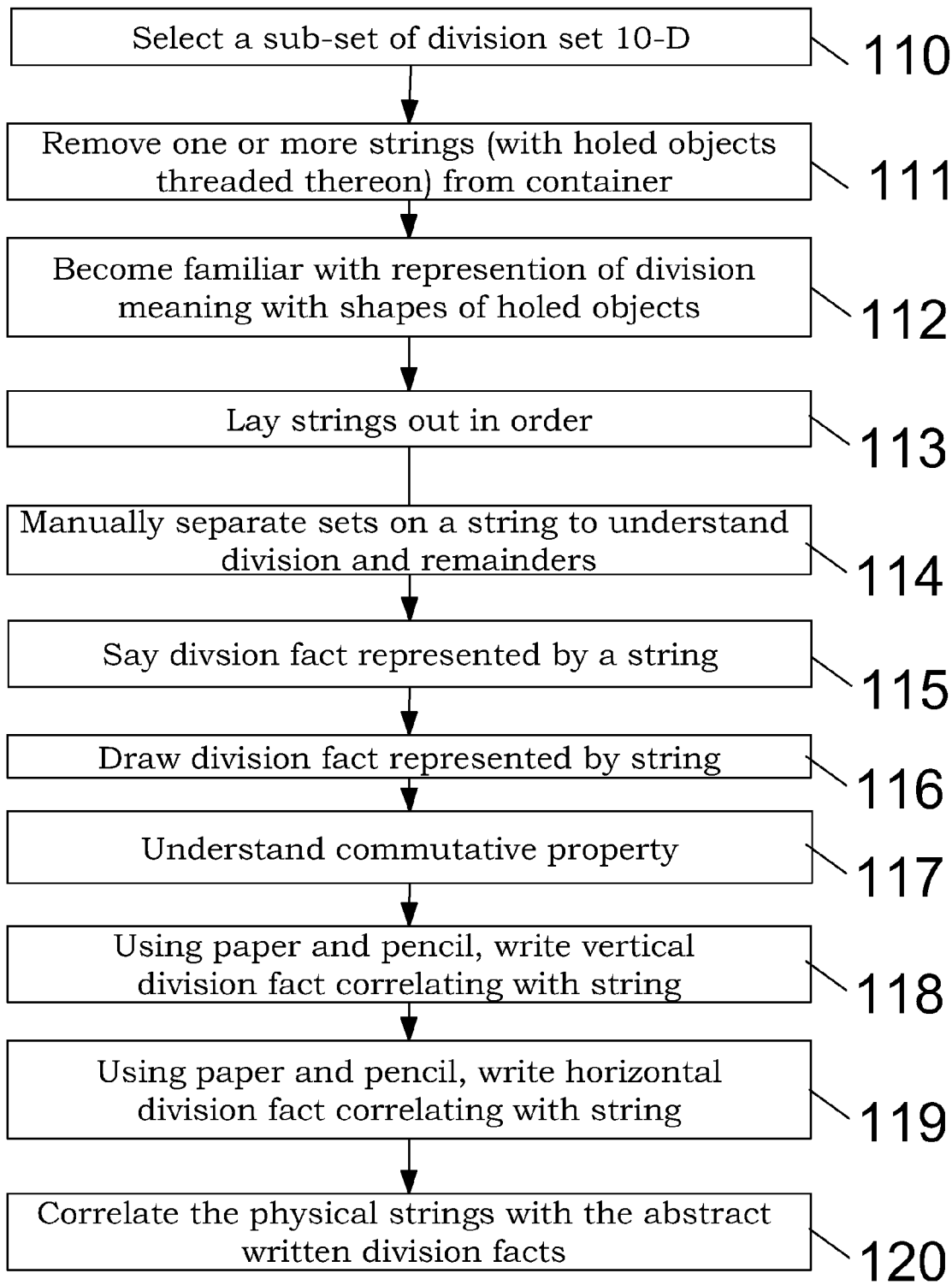
FIG. 11 is a flowchart showing the method used in teaching division utilizing the "8" sub-set of the multiplication set of the first preferred embodiment of the string math manipulative system of the present invention.

Referring now to FIG. 11, the method of teaching division facts using the string math manipulative of the present invention is presented. In general, the steps are similar to the steps in teaching addition, subtraction, and multiplication, as above described, with the following additions and exceptions included in step 112. To become familiar 112 with the representation of the meaning of division by the shapes of the objects, at first a single string may be removed, such as string 11x, with only one variation of holed objects, or such as string 11r, with only two variations. The teacher may explain division with a single string, for simplicity.

If a string with a single variation is used to teach, the student moves the holed objects 15 by selecting the number of holed objects 15 to be divided by (the divisor). For example, the student when the divisor is 2, the student practices dividing by 2 by separating the holed objects into groups of 2. Reusing the same string again, the student can practice division by other numbers.

After the student(s) understands the division represented by the strings with one or two variations, another string with three variations (for example 11s) can be presented to allow the student(s) to understand the concept of a "remainder".

After practice, the student, as in the method for teaching addition, subtraction, and multiplication, can gradually move to the semi-abstract by drawing 116 the strings on paper, using paper and pencil to write the division facts represented by the strings in one or more of the standard formats (vertical or horizontal) 118, 119 and then to the abstract by correlating 120 the strings with written math problems. The standard division formats include various formats using a variety of division symbols, for example, the horizontal formats of "8/2=4" and of "8÷2=4", or the vertical format using what is generally referred to as a long-division symbol $$"2\overline{)8}^{4}".$$

Additionally, after gaining an understanding of division, the student(s) can be assisted in understanding that multiplication and division are opposites.

As skip counting is considered by many educators to be a basic prerequisite skill often taught before (and/or concurrently with) multiplication, special provision is made in the present invention to teach skip counting. Students gain practice in oral counting, plus the "sing-song" rhythms increase awareness and memorization, thus aiding in learning multiplication and division facts. Pre-teaching for the younger student(s) may include learning to count to 100, familiarization with patterns, gaining insight into the meaning of numerals, and acquiring an understanding of the concept of relating physical objects to the written numbers.

Skip counting can be taught by utilizing either or both of the following sets of the present invention: 1. the multiplication set 10-M as illustrated in FIG. 6; or 2. a multi-variation (color and/or shape and/or material) skip counting set 10-SC having a pattern similar to the multiplication set 10-M (a series of a particular number of first-variation holed objects followed by a series of a particular number of second-variation holed objects 15b) but with each string having approximately 100 holed objects up to 144 objects, as shown in FIG. 14. Preferably after the student(s) has become comfortable with skip counting, the student(s) will progress to using strings from either of the above sets to assist in learning and in internalizing multiplication facts, and eventually, division facts, also.

Figure 12:
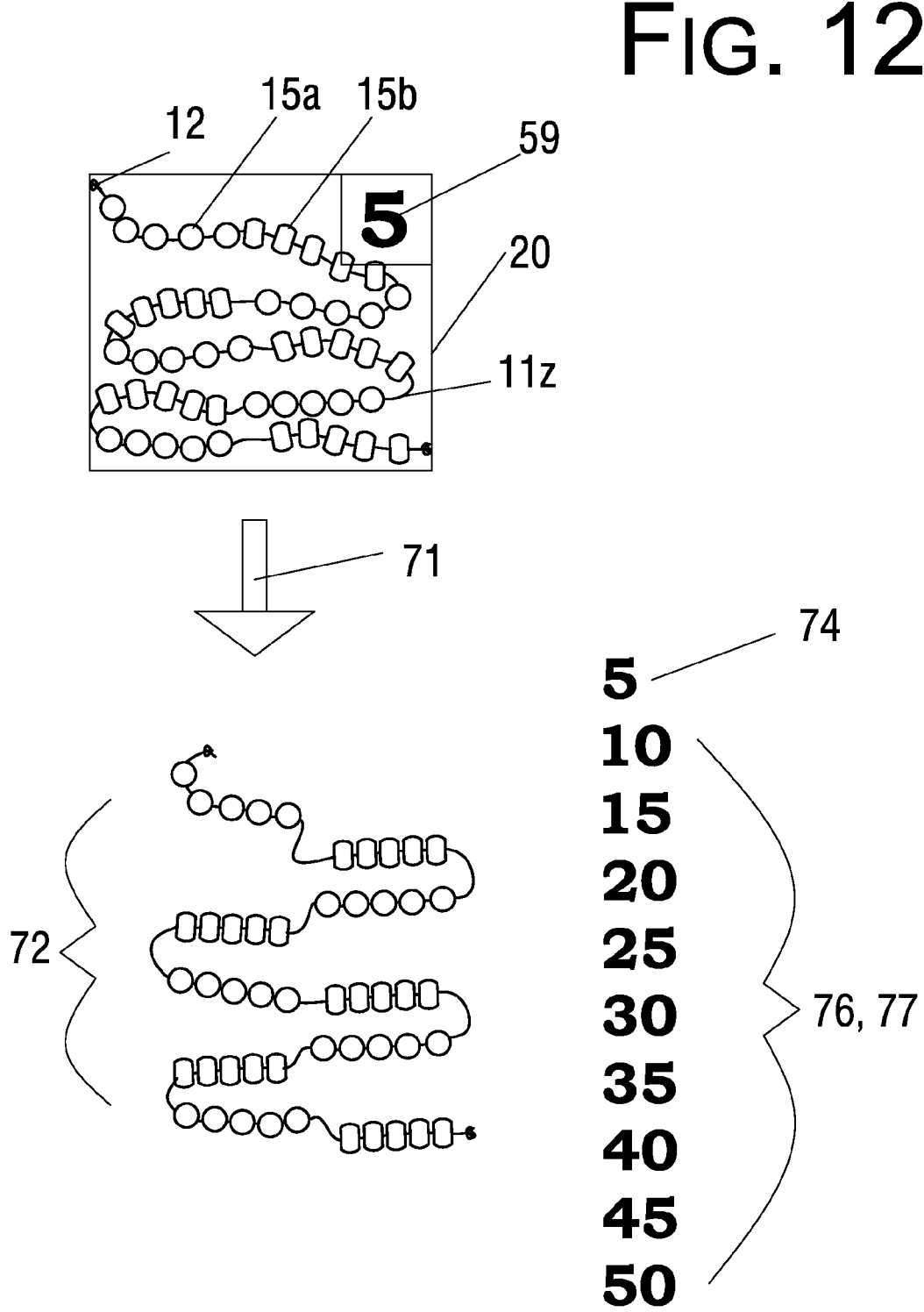
FIG. 12 is a top schematic view showing skip counting by 5's in the skip counting set of the first preferred embodiment of the string math manipulative system of the present invention.

For example, string 11z representing "10×5=50" from the multiplication set 10-M (FIG. 6) can be used to teach skip counting by 5's, as illustrated in the FIG. 12. Or any one of the strings from the multi-variation skip counting set 10-SC illustrated in FIG. 13 and FIG. 14 can be used with the presented method. But to teach the division fact that corresponds, "50/10=5" the "5×10=50" string from the "10's" set may be chosen.

Figure 13:
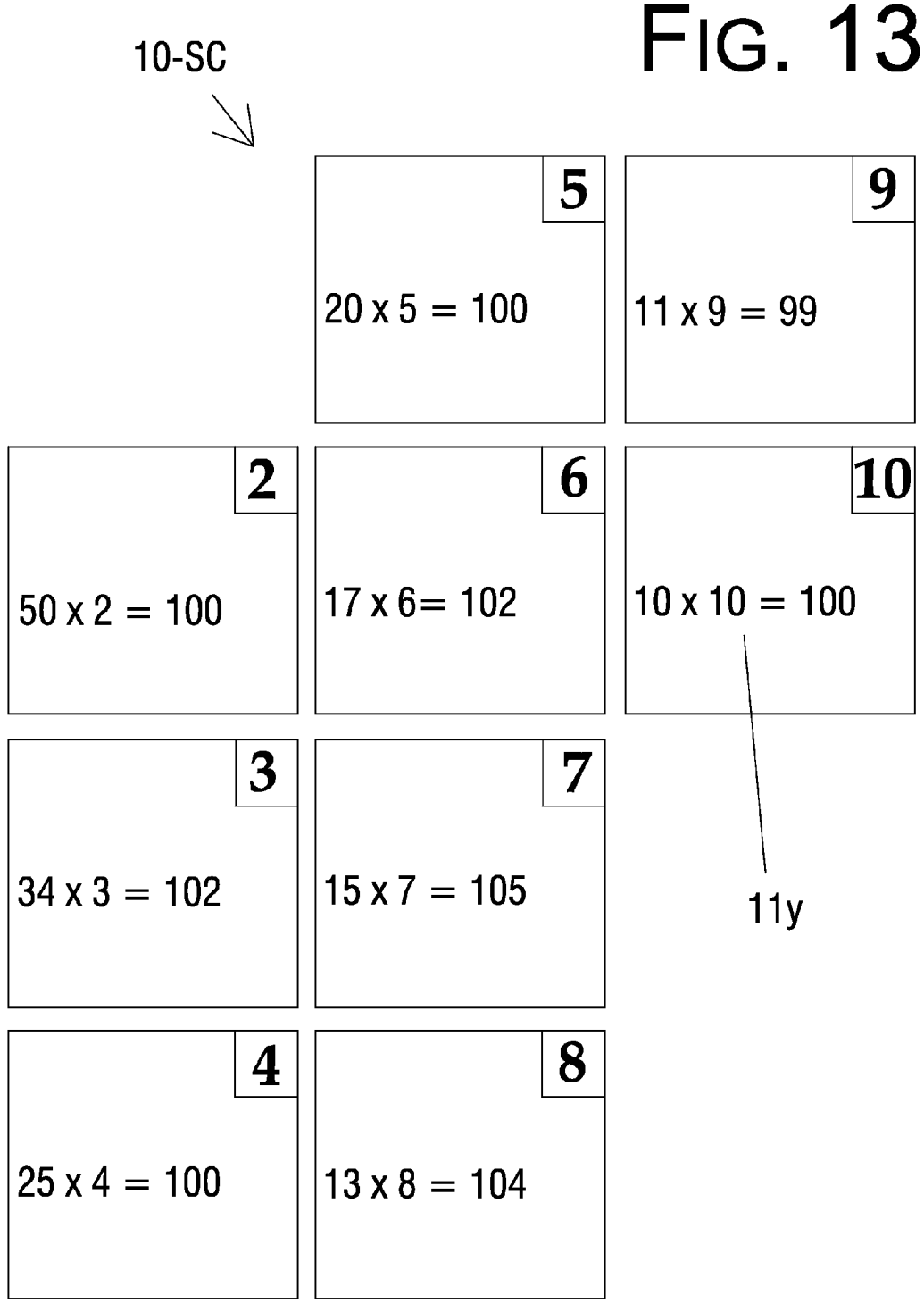
FIG. 13 is a top schematic view showing a skip counting set of a first preferred embodiment of the string math manipulative system of the present invention.

The multi variation skip counting set 10-SC illustrated in FIG. 13 includes sub-sets for skip counting by 2's to 10's to at or near 100, as shown, or, alternately can include sub-sets for skip counting by 2's to 12's to at or near 144. Each sub-set includes a single string threaded with a number of holed objects of two variations. The repeating pattern provided is the following: 1. a series of first-variation holed objects 15e, with the number of first-variation holed objects 15e being equal to the skip counting number to be taught; and 2. a series of second-variation holed objects 15f, with the number of second-variation holed objects 15f being equal in number to the skip counting number to be taught. For example to skip count by 5's, the pattern is five of the first-variation holed objects 15e followed by five of the second-variation holed objects 15f, as illustrated by thread 11y (FIG. 13, FIG. 14). The pattern is repeated until the desired number of holed objects is threaded, which is preferably near 100 (thread 11y, FIG. 14) up to at or near 144 (thread 11aa, FIG. 14) or up to 12 times the number of holed objects in a set.

Figure 15:
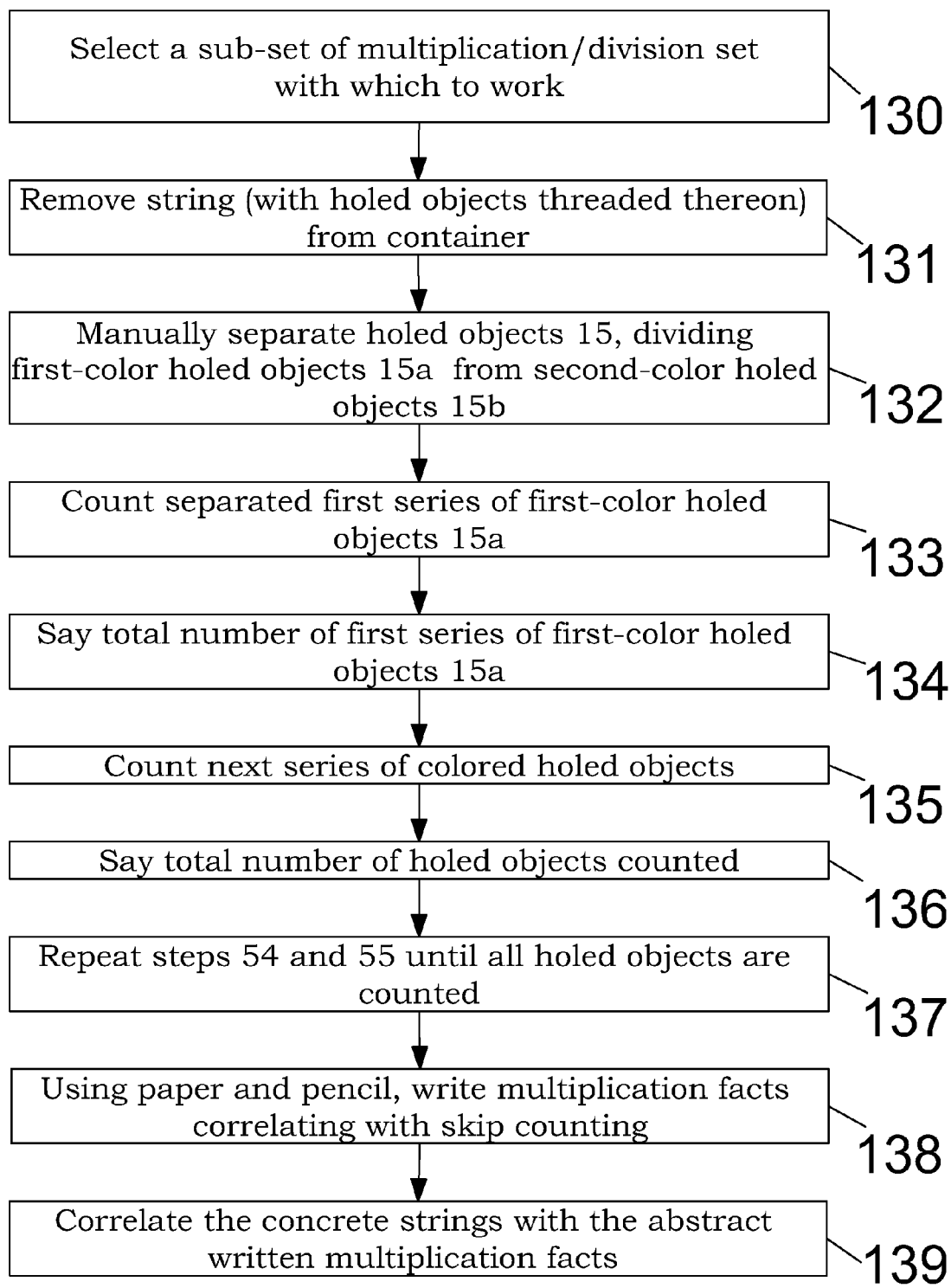
FIG. 15 is a flowchart showing the method used in teaching skip counting utilizing skip counting set of the first preferred embodiment of the string math manipulative system of the present invention.

Referring now to FIG. 15, to begin the instruction a sub-set is selected 130 with which the student is to work. The desired string 11 is removed 131 from the container 20. The student is shown the pattern and manually separates 132 the first series of first-variation holed objects 15e from the following series of second-variation holed objects 15f, counting (steps 133, 135) the holed objects if necessary, and saying (steps 134, 136) the total number at the end of each series, repeating (step 137) until the end of the string is reached. For example, in this case of skip counting by 5's with string 11z (FIG. 12), the student would say "5, 10, 15, 20, 25, 30, 35, 40, 45, 50".

Further pencil and paper work may then be done as the student moves from the concrete steps to the pictorial and to the abstract, while understanding the concepts behind multiplication, and, subsequently, understanding the concepts behind division. Multiplication and division facts (without remainders) can be drawn, written 78 and correlated 79 to the holed objects 15e, 15f pattern.

Other skip counting multiplication facts would be taught in a similar manner by teaching skip counting using the appropriate sub-set of the skip counting set 10-M of the of the present invention or the skip counting set 10-SC of the present invention.

Optionally, division without remainders can also be taught using the skip counting set 10-SC of the present invention, using a similar method. Thus division without remainders may be taught with either set 10-M (FIG. 6 to FIG. 8) or set 10-SC (FIG. 12 to FIG. 15). Division with remainders may be taught with set 10-D (FIG. 9 to FIG. 11).

Figure 16:
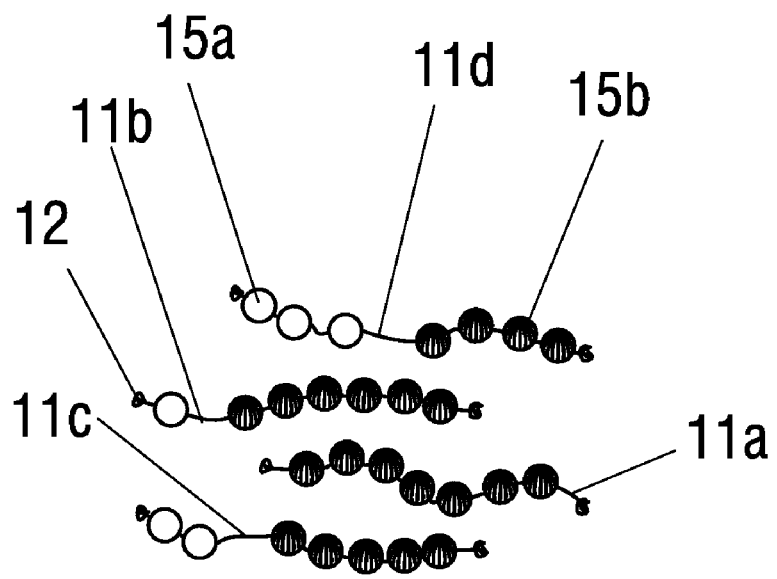
FIG. 16 is a top schematic view illustrating a second preferred embodiment of the string math manipulative system of the present invention.
Figure 17:
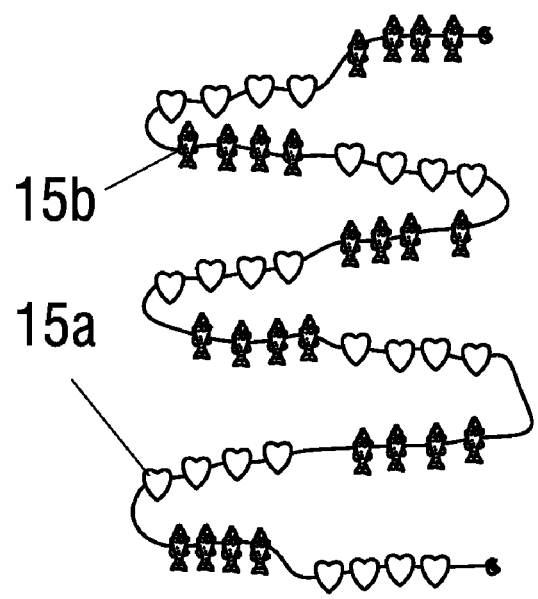
FIG. 17 is a top schematic view illustrating a third preferred embodiment of the string math manipulative system of the present invention.

FIG. 16 and FIG. 17 illustrate a second and third exemplary embodiment of the string math manipulative system of the present invention. The second embodiment of FIG. 16 demonstrates an additional variation type. The single sub-set of the addition number family of "7" of the second embodiment of FIG. 16 varies from the single sub-set of the addition number family of "7" of the first embodiment of FIG. 2 in that while the colors are different between the two variations of holed objects 15a, 15b, the shapes remain substantially identical.

The third embodiment of FIG. 17 illustrates an additional variety in shapes of holed objects 15, in which the holed objects are provided in shapes that might be familiar or interesting to children, as opposed to limiting the invention to merely geometric shapes. These include, but are not limited to, such shapes as the following: animals, bugs, sea creatures, people, holiday shapes (for example, shamrocks, Christmas trees, snowflakes, jack-o-lanterns, Easter eggs, hearts, etc.), sports shapes, beads with smiley faces, or the like.

Both the second and third embodiment also illustrate that the string math manipulative need not be placed in container 20. For example, students can manually construct one or more sets of addition 10-A, subtraction 10-A, skip counting 10-SC, multiplication 10-M, or division 10-A sets themselves, by threading holed objects 15 onto strings 11. At first a model is preferably provided for the students to copy, but after sufficient practice, the students will be able to construct sets of math facts without a model. For additional interest, holed objects 15 might be edible, such as holed candies or cereals and/or strings 11 might be edible, such as licorice laces. Then upon completion of the math exercise, the students could eat the string math manipulative. Thus a wide variety of shapes, colors, sizes, textures, and materials are within the scope of the invention.

Similarly, a wide variety of colors are within the scope of the invention. No colors have been specified for the component parts and there are many different color combinations that may be utilized in the manufacture of the string math manipulative system of the present invention; for example, holed objects 15 may be painted or printed with the following: bright primary colors, colors to match a theme or season, glittered colors, pearlized finish colors, tie-dyed colors, distinguishable patterns, a smiley face, or other small images.

Figure 18:
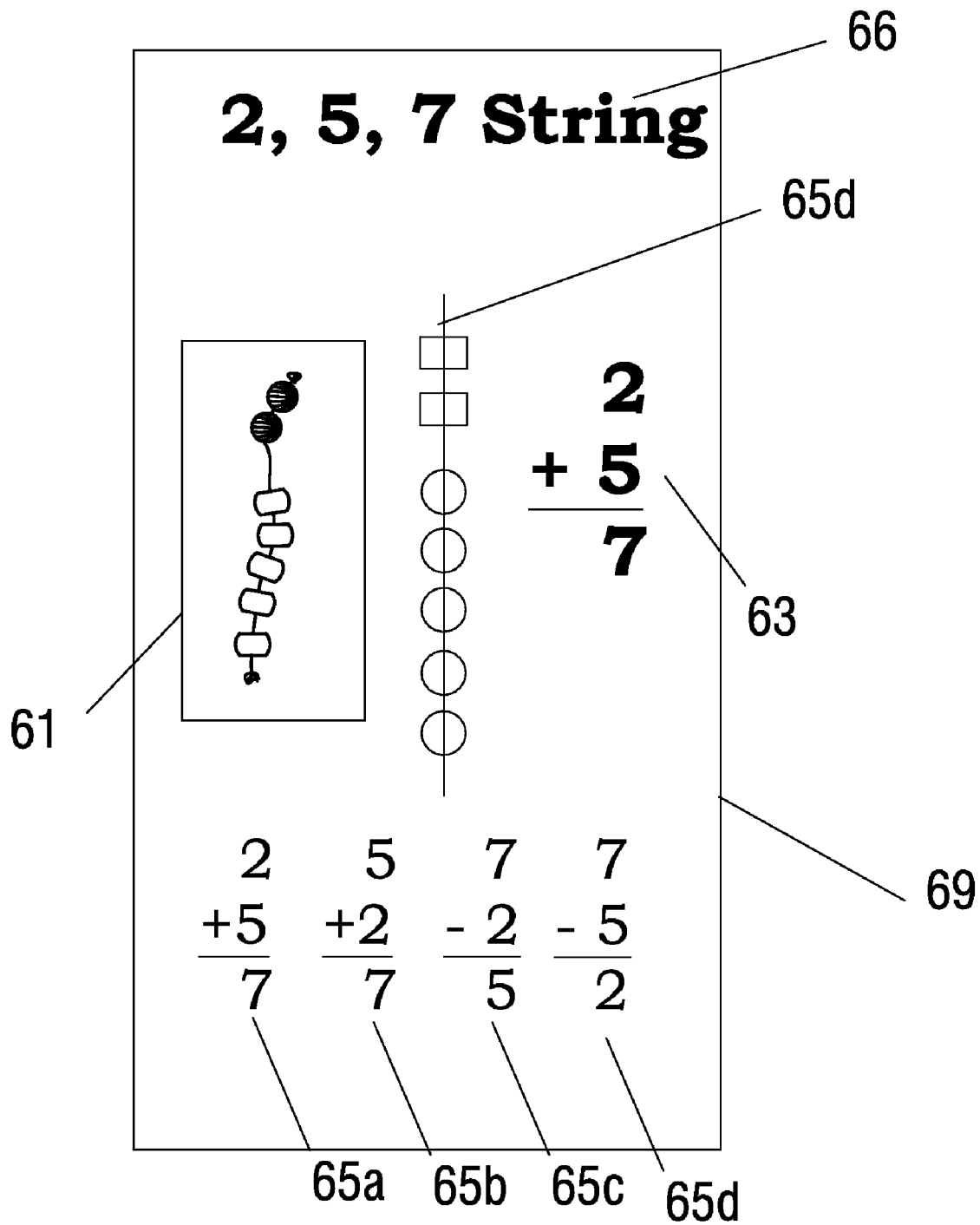
FIG. 18 is a top schematic view illustrating a representational flash card (either single-sided or double-sided) application of the string math manipulative system of the present invention.
Figure 19:
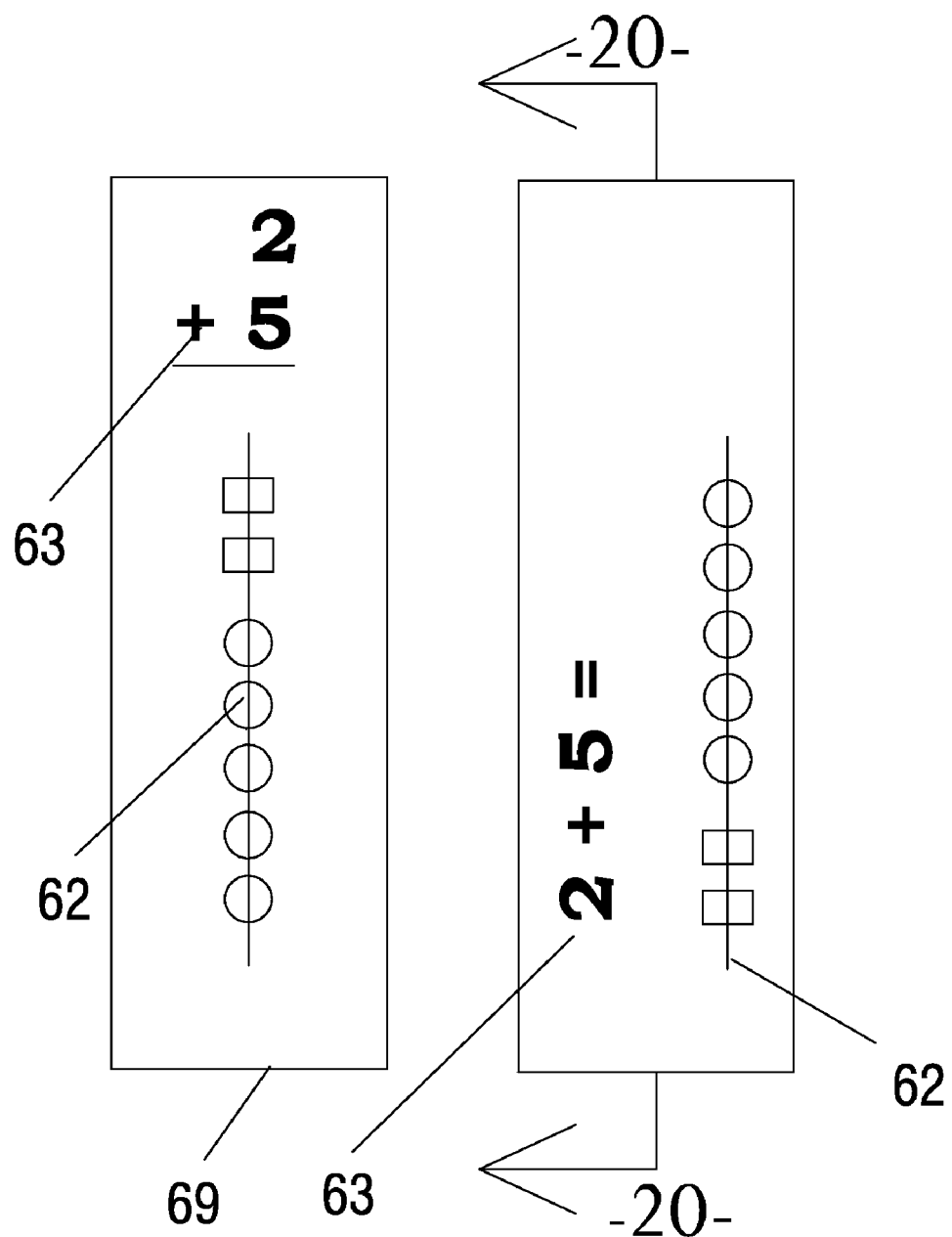
FIG. 19 is a top schematic view illustrating a horizontal representational flash card and a vertical representational flash card of the string math manipulative system of the present invention.

Referring now to FIG. 18 and FIG. 19, as a specific teaching aid and application of the string math manipulative system and method of the present invention, representational flash cards 69 may optionally be inserted into the containers 20 with the bead-on-string manipulatives. These representational flash cards 69, are designed to bridge the gap between the concrete (the student's interaction with the physical objects, touching, moving, and internalizing the concept of the particular math fact) and the abstract, using written numerals to symbolize the math fact. Some students are quickly able to jump from the concrete to the abstract, but it presents a significant hurdle to a large number of students—and all students can benefit by at least some exposure to the intermediary stage presented by the representational flash cards.

The representational flash cards 69 represent the math fact presented by the 3-dimensional physical objects (first-variation holed objects 15a and second-variation holed objects 15b, as illustrated in FIG. 2) by 2-dimensional pictures 61 and/or 2-dimensional graphic diagrams 62 portraying the 3-dimensional physical objects. Generally the 2-dimensional pictures 61 and/or 2-dimensional graphic diagrams 62 are displayed beside the math fact 63 being depicted, as illustrated. Also, the representational flash card may include a title 66 (such as 2, 5, 7, String, as illustrated in FIG. 18). Further the representational flash card may include the complete written math facts that can be demonstrated with the 2, 5, 7 sting, written as numeral math facts 65a, 65b, 65c, 65d.

Thus the representational flash cards allow the student to take incremental steps between the 3-dimensional physical objects (first-variation holed objects 15a and second-variation holed objects 15b) and the written numeral math facts 65a, 65b, 65c, 65d. The first step is progressing from the 3-dimensional physical object to the 2-dimensional picture 61, understanding that the 2-dimensional pictures 61 represents the 3-dimensional physical object. The next step is understanding that the 2-dimensional graphic diagram 62 represents the 2-dimensional picture 61 that further represents the 3-dimensional physical object. The next step is understanding that the written numeral math facts 65a, 65b, 65c, 65d are represented by the 2-dimensional graphic diagram 62 which represents the 2-dimensional picture 61 that further represents the 3-dimensional physical object. Thus the leap that was required to jump from the concrete to the abstract is broken into intermediary stages.

The representational flash cards 69 may additionally be implemented in raised numerals or Braille numerals for visually handicapped students. For example, in FIG. 19, instead of, or in addition to, being printed with the 2-dimensional graphic diagrams 62 displayed beside the math fact 63, both or either of the dimensional graphic diagrams 62 and/or math fact 63 can be raised, touchable. Or alternatively or additionally, the numeral can be written in Braille. One exemplary method to obtain touchable images is by using an image enhancer with a specialized, durable swelled and/or capsulated paper that causes the black ink lines to rise up, as is known in the art. In this manner, a swelled paper string of beads is produced, and the students can feel the outline of the rectangles and circles. Non-visually impaired students can also feel the outline of the beads and string, plus seeing the colors.

A second exemplary method to produce raised images is to utilize an embosser with plain paper or oak tag. The embossing machine is used to form raised dots (similar to Braille dots) in the shapes of the objects and of the string. The embossing machine can also add the math fact problem in Braille. Preferably the paper is run through a regular printer to put colored ink on top so that the raised object shapes are in color and the numbers are printed in regular numbers so that a sighted person can see them.

The highly textured and/or color-coded single-sided representational flash cards 69 involve more senses, helping the normal or visually impaired student learn. The physical beads and string that corresponds to the raised image representational flash card 69 may be matched or compared for additional reinforcement.

A further implementation of the raised image representational flash cards 69 is a double-sided raised image representational flash card 69, illustrated in FIG. 20. Two pages (69-top and 69-bottom, FIG. 20) are glued back to back, with each page having the raised beads and string. The back page is the reverse of the front page, so that the beads can be felt on both the front and the back, thus providing an incremental step from the 3-dimensional physical object, the actual holed objects on the string, to a semi-abstract double-sided raised image representational flash card 69. The double-sided raised image representational flash card 69 demonstrates in a visual, concrete, tactile way, the association of the related math facts. A logo or raised pattern may be imprinted to orient the student to the top and bottom of the card, as desired.

An additional benefit occurs with multiplication and division. As multiplication and division are opposites, as the student reads the front string from left to right for multiplication and feels of the back string from right to left for division. For example, the front of the card has 4×6=24, and the back of the card has 24÷6=4.

Additionally, the single-sided or double-sided raised image representational flash card 69 may at times be easier to carry and use than the physical string and holed objects. For example, a student might be able to conveniently review the single-sided or double-sided raised image representational flash cards 69 in a car or outside. These single-sided or double-sided raised image representational flash cards 69 will educationally benefit many types of students such as educable mentally handicapped, physically handicapped, low-vision, specific learning disabled, preschool students, regular education students, etc.

Referring now to FIG. 21, an additional optional component, a signal bead 67, of the string math manipulative system and method of the present invention is disclosed. The signal bead 67 gives a visual cue or signal to the student, identifying how many sets of beads are on a particular string; thereby a fast alternative is provided to put the longer multiplication and division strings in order and/or skip count without having to count all of the sets of beads on each string. The number on the fixed bead at the beginning of the string tells the number of sets on the particular string. The signal bead 67 is clearly and distinctively marked. For example, each side of signal bead 67 may have a written numeral, or some sides may have a printed numeral and some sides have the numeral in raised letters in Braille. Alternatively, all sides may be imprinted with Braille numerals, or the numeral could be depressed into the face or faces of the signal bead 67.

Another optional version of the multiplication/division strings of the string math manipulative system and method of the present invention is disclosed having a single variant of the holed objects, for example, all the same color and shape, but with a preferably smaller "stop" bead (not shown), separating the sets of beads. At times this might provide some advantages. The students would be taught not to count the stop bead, but merely use it as a separator. Most preferably the stop bead would be small.

While the instructions and methods have been herein presented as applied to a teacher instructing a student with sufficient visual acuity to complete the instructions, the instructions and methods can equally well be adapted in a manner to accommodate visually impaired and/or blind students. The tactile differences and varied shapes and/or textures and/or sizes of the beads make the stings of beads easily distinguishable and readable, negating the need for operational signs in order to use the string math manipulative system and method of the present invention.

While the instructions and methods have been herein presented as applied to a teacher instructing a student with sufficient hearing ability to understand oral instructions, the instructions and methods can be provided in a manner accommodating deaf and/or hard-of-hearing students. For example, the instructions can be presented by interpreters using sign language and/or by written captions on visually viewable media (such as video clips or DVD's).

Additionally, other instructions and helpful math hints or accessories to the string math manipulative system and method of the present invention may be included within container 20. For example, a chart similar to FIG. 7 showing the multiplication table for the number "3" can be printed on write-on/wipe-off paper and placed in the container 20 of the sub-set of the "3" multiplication family of the multiplication set 10-M, for added reinforcement.

Although described as used in a classroom situation, some or all of the method steps of the present invention can equally well be performed by a student alone or with a parent assisting. Also, the string math manipulative is very portable and can be used while traveling, at a beach, in a park, at the dining table, on vacation, and the like. As the string math manipulative is self-contained when containers 20 are used, loss of individual pieces does not occur.

From the foregoing, it will be apparent that the string math manipulative system of the current invention provides an organized, systematic teaching system and method that not only improves memorization of math facts, but also improves conceptual understanding of the math facts and of related math concepts. This is done by providing a concrete, multi-sensory experience that builds a basis for progressing to the abstract level of written math facts. After working with the string math manipulative system and method of the present invention, the students have visual, tactile, auditory, and kinesthetic memory of the strings through their extensive and varied experiences. The students always work with the 3 related numbers together on the string, and therefore make the association that they belong together. The 3 related numbers (the fact family) are identified and/or defined by the holed objects on the string. The physical organization of the holed objects on the string as a stand-alone unit eliminates the conventional, but inefficient, negative of having to search for each small object, tile, or cube that has been randomly spread out on the work tray, and of then having to arrange them temporarily on another surface, such as a slate with pre-defined slots to hold the objects in place. Further, when the student is done, conventionally the student must disassemble the math fact family manipulative and reassemble it for the next math problem, which is not at all efficient. This is eliminated by using the string math manipulative system and method of the present invention.

And, unlike slates, abaci, or calculators, the facts are permanently stored on each individual string and are further organized by being place in containers by learning groups/fact families. This fosters understanding of the concepts and memorization of facts. Use of the string math manipulative system and method can provide the prerequisite skills needed to use a slate, abacus, or calculator or talking calculator, since these devices assist the sighted student and/or visually handicapped student in recording whatever math problem he or she chooses to work on. String Math can also provide the concrete link which gives the abstract numbers real meaning when entered onto the calculator, abacus or slate. The student can hold the string, count the holed objects, and then enter the data; thereby giving the act of data entry a real, concrete meaning by taping into the student's prior knowledge and experiences.

Lessons teaching the string math manipulative system and method of the present invention can be presented in any one or more of a variety of formats, such as, for example, printed text, an audio-cassette tape of the text, totally in Braille text, a digital talking book such as on CD or DVD, a talking software program that may highlight the text as the book is read, or a software program with narrated video clips and/or graphic segments demonstrating the building of the bead-on-string manipulative, and the like.

Also, the system and method of the present invention is encouraging to the student. For example, instead of seeing over 150 random addition number facts on a page and/or matching individual objects to math problems, the addition sub-sets allow the student to visualize all the math facts in an addition number family. Similarly, the multiplication and division sets of strings threaded with holed objects allow the factors and products in multiplication and the dividends, divisors, and quotients in division to be visualized.

While some students may require more practice than others to achieve the same level of competency, the string math manipulative system of the current invention is beneficially used by a wide variety of students, including average students, high achievers, remedial students, physically handicapped students, or visually handicapped students, and is beneficially used with any textbook or math curriculum.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A method to teach math facts to a student or to learn math facts, comprising:
    obtaining a particular number family set representing all of the math facts in said particular number family, wherein said particular number family set comprises a plurality of strings, each of said plurality of strings having a specified number of total holed objects and each of said plurality of strings configured to represent one of said math facts, each of said plurality of strings being threaded with a first series of first-variation holed objects having a first discriminating characteristic, with a portion of said plurality of strings being threaded with said first series of first-variation holed objects having a first discriminating characteristic and with a second series of second-variation holed objects having a second discriminating characteristic, wherein each string in said number family set has the same number of total holed objects and a different number of first-variation holed objects;
    removing a first one of said plurality of strings from said particular number family set;
    sliding said first series of first-variation holed objects along said first one of said plurality of strings; and
    correlating said first series of first-variation holed objects to a numeral in a first math fact.

2. The method to teach math facts to a student or to learn math facts, as recited in claim 1, comprising:
    removing a second one of said plurality of strings from said particular number family set;
    sliding said first series of first-variation holed objects along said second one of said plurality of strings;
    sliding said second series of second-variation holed objects along said second one of said plurality of strings; and
    correlating said first series of first-variation holed objects and said second series of second-variation holed objects to numerals in a second math fact.

3. The method to teach math facts to a student or to learn math facts, as recited in claim 2, wherein:
    said second math fact comprises a first addition fact;
    said specified number of total holed objects corresponds to the sum of said first addition fact;
    the number of said first-variation holed objects in said first series corresponds to the first addend of said first addition fact; and
    the number of said second-variation holed objects in said second series corresponds to the second addend of said first addition fact.

4. The method to teach math facts to a student or to learn math facts, as recited in claim 3, further comprising flipping one of said plurality of strings threaded with said first series of said first-variation holed objects and with said second series of said second-variation holed objects to demonstrate a third math fact comprising a second addition fact, wherein the number of said second-variation holed objects in said second series corresponds to the first addend of said second addition fact and the number of said first-variation holed objects in said first series corresponds to the second addend of said second addition fact.

5. The method to teach math facts to a student or to learn math facts, as recited in claim 3, further comprising:
    counting said first series of said first-variation holed objects; and
    counting said second series of said second-variation holed object.

6. The method to teach math facts to a student or to learn math facts, as recited in claim 5, further comprising:
    obtaining paper and a writing instrument; and
    writing an addition fact that corresponds to said first addition fact.

7. The method to teach math facts to a student or to learn math facts, as recited in claim 2, wherein:
    said math fact comprises a first subtraction fact;
    said specified number of total holed objects corresponds to the minuend of said first subtraction fact;
    the number of said first-variation holed objects in said first series corresponds to the subtrahend of said first subtraction fact; and
    the number of said second-variation holed objects in said second series corresponds to the difference of said first subtraction fact.

8. The method to teach math facts to a student or to learn math facts, as recited in claim 7, further comprising flipping one of said plurality of strings threaded with said first series of said first-variation holed objects and with said second series of said second-variation holed objects to demonstrate a fourth math fact comprising a second subtraction fact, wherein the number of second-variation holed objects in said second series then corresponds to the subtrahend of said second subtraction fact, and the number of first-variation holed objects in said first series then corresponds to the difference of said second subtraction fact.

9. The method to teach mathematics, as recited in claim 2, wherein:
    said math fact is a multiplication fact;
    said specified number of total holed objects corresponds to the product of said multiplication fact;
    the number of said first-variation holed objects in said first series is equal to the number of said second-variation holed objects in said second series, with said number of said first-variation holed objects in said first series and said number of second-variation holed objects in said second series corresponding to the multiplicand of said multiplication fact; and
    the number of series of first-variation holed objects plus the number of series of second-variation holed objects corresponds to the multiplier of said multiplication fact.

10. The method to teach mathematics, as recited in claim 2, wherein:
- said math fact is a division fact;
- said specified number of total holed objects corresponds to the dividend of said division fact;
- the number of said first-variation holed objects in said first series is equal to the number of said second-variation holed objects in said second series, with said number of said first-variation holed objects in said first series and said number of said second-variation holed objects in said second series corresponding to the divisor of said division fact; and
- the number of series of first-variation holed objects plus the number of series of second-variation holed objects corresponds to the quotient of said division fact.

11. The method to teach mathematics, as recited in claim 2, wherein said first discriminating characteristic and said second discriminating characteristic comprise colors, shapes, sizes, textures, or materials.

12. A math manipulative system for teaching or studying mathematics, comprising a particular number family set of math manipulatives representing the math facts of said particular number family, said particular number family set of math manipulatives comprising:
- a plurality of strings, each having a predetermined length and each having two opposing ends;
- multiple retaining mechanisms, with one of said multiple retaining mechanisms disposed at each of said two opposing ends of each of said plurality of strings;
- a plurality of first-variation holed objects having a generally axial hole, having a first discriminating characteristic, being adapted to be threaded upon one of said plurality of strings, arid being adapted to be retained by one of said multiple retaining mechanisms; and
- a plurality of second-variation holed objects having a generally axial hole, having a second discriminating characteristic, being adapted to be threaded upon one of said plurality of strings, and being adapted to be retained by one of said multiple retaining mechanisms, wherein each string in said number family set has the same number of total holed objects and a different number of first-variation holed objects and wherein the number and specific configuration of said plurality of first-variation holed objects and of said plurality of second-variation holed objects on particular of said plurality of strings correspond to and represent numerals in one math fact of a number family.

13. The math manipulative system for teaching or studying mathematics, as recited in claim 12, wherein said number family is an addition number family.

14. The math manipulative system for teaching or studying mathematics, as recited in claim 12, wherein said number family is a subtraction number family.

15. The math manipulative system for teaching or studying mathematics, as recited in claim 12, wherein said number family is a multiplication number family.

16. The math manipulative system for teaching or studying mathematics, as recited in claim 12, wherein said number family is a division number family.

17. The math manipulative system for teaching or studying mathematics, as recited in claim 12, wherein said first discriminating characteristic is a color and wherein said second discriminating characteristic is a color.

18. The math manipulative system for teaching or studying mathematics, as recited in claim 12, wherein said first discriminating characteristic is a shape and wherein said second discriminating characteristic is a shape.

19. The math manipulative system for teaching or studying mathematics, as recited in claim 12, wherein said first discriminating characteristic is a material and wherein said second discriminating characteristic is a material.

20. The math manipulative system for teaching or studying mathematics, as recited in claim 1, wherein said first discriminating characteristic is a size and wherein said second discriminating characteristic is a size.

21. The math manipulative system for teaching or studying mathematics, as recited in claim 12, further comprising representative flash cards configured with a 2-dimensional graphic diagram of said number and specific configuration of said plurality of first-variation holed objects and of said plurality of second-variation holed objects on particular of said plurality of strings.

22. The math manipulative system for teaching or studying mathematics, as recited in claim 21, wherein said representative flash cards are further configured with a numeral presentation of the math fact corresponding to said 2-dimensional graphic diagram.

23. The math manipulative system for teaching or studying mathematics, as recited in claim 21, wherein said 2-dimensional graphic diagram is configured to be raised above the level of the paper so as to be able to be felt by said student.

* * * * *